(12) United States Patent
Mueck et al.

(10) Patent No.: US 10,939,300 B2
(45) Date of Patent: Mar. 2, 2021

(54) EVOLVED NODE-B, LOCAL CONTROLLER AND METHOD FOR ALLOCATION OF SPECTRUM FOR SECONDARY USAGE

(71) Applicant: Apple Inc., Cupertino, CA (US)

(72) Inventors: Markus Dominik Mueck, Unterhaching (DE); Pierce Rixon, Sydney (AU); Michael Heimlich, Sydney (AU); Eryk Dutkiewicz, Sydney (AU); Christian Drewes, Germering (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/760,570

(22) PCT Filed: Sep. 22, 2015

(86) PCT No.: PCT/US2015/051523
§ 371 (c)(1),
(2) Date: Mar. 15, 2018

(87) PCT Pub. No.: WO2017/052517
PCT Pub. Date: Mar. 30, 2017

(65) Prior Publication Data
US 2019/0045367 A1 Feb. 7, 2019

(51) Int. Cl.
*H04W 16/14* (2009.01)
*H04W 72/04* (2009.01)
*H04W 88/08* (2009.01)

(52) U.S. Cl.
CPC ........... *H04W 16/14* (2013.01); *H04W 72/04* (2013.01); *H04W 88/08* (2013.01)

(58) Field of Classification Search
CPC ...... H04W 16/14; H04W 72/04; H04W 88/08
See application file for complete search history.

(56) References Cited

U.S. PATENT DOCUMENTS

2013/0231124 A1  9/2013  Vrzic et al.
2014/0080535 A1* 3/2014  Gauvreau ............. H04W 16/14
                                                        455/513

(Continued)

FOREIGN PATENT DOCUMENTS

WO   WO-2014078676 A2   5/2014
WO   WO-2015022016 A1   2/2015
WO   WO-2015071704 A1   5/2015

OTHER PUBLICATIONS

"Federal Communications Commission: Amendment of the Commission's Rules with Regard to Commercial Operations in the 3550-3650 MHz Band", Washington D.C 20554, GN Docket No. 12-354, FCC 15-47, (Apr. 21, 2015), 187 pgs.

(Continued)

*Primary Examiner* — Un C Cho
*Assistant Examiner* — Yu-Wen Chang
(74) *Attorney, Agent, or Firm* — Kowert, Hood, Munyon, Rankin & Goetzel, P.C.

(57) ABSTRACT

Embodiments of an Evolved Node-B (eNB), Local Controller (LC) device, and methods for allocation of shared spectrum for secondary usage are generally described herein. In some cases, primary usage of the shared spectrum may be prioritized over the secondary usage of the shared spectrum. The eNB may receive, from the LC device, a spectrum availability message that indicates an availability of the shared spectrum for the secondary usage. The eNB may transmit, to the LC device, spectrum sensing information that is based at least partly on one or more signal strength measurements for UEs connected to the eNB. The eNB may further transmit, to the LC device, a spectrum engagement message that indicates an intention of the eNB to use at least a portion of the shared spectrum for communication with the UEs.

17 Claims, 10 Drawing Sheets

(56) References Cited

U.S. PATENT DOCUMENTS

| | | | |
|---|---|---|---|
| 2014/0192685 A1 | 7/2014 | Mueck et al. | |
| 2014/0287693 A1* | 9/2014 | Li | H04W 16/14 455/67.11 |
| 2014/0357218 A1* | 12/2014 | Andrianov | H04W 16/14 455/406 |
| 2015/0017999 A1* | 1/2015 | Chen | H04W 16/14 455/452.1 |
| 2015/0237504 A1* | 8/2015 | Xie | H04W 16/10 455/454 |
| 2015/0245333 A1* | 8/2015 | Hulkkonen | H04W 72/042 370/329 |
| 2015/0319621 A1* | 11/2015 | Markwart | H04W 16/14 455/454 |
| 2015/0373554 A1* | 12/2015 | Freda | H04L 5/0064 455/450 |
| 2016/0066192 A1* | 3/2016 | Markwart | H04W 16/14 455/410 |
| 2016/0337865 A1* | 11/2016 | Morioka | H04W 16/14 |
| 2017/0251386 A1* | 8/2017 | Buchmayer | H04W 16/14 |
| 2017/0318469 A1* | 11/2017 | Perez | H04W 16/10 |
| 2018/0213407 A1* | 7/2018 | Miao | H04W 28/18 |

OTHER PUBLICATIONS

"International Application Serial No. PCT/US2015/051523, International Search Report dated Aug. 26, 2016", 5 pgs.
"International Application Serial No. PCT/US2015/051523, Written Opinion dated Aug. 26, 2016", 11 pgs.

* cited by examiner

EVOLVED NODE-B, LOCAL CONTROLLER AND METHOD FOR ALLOCATION OF SPECTRUM FOR SECONDARY USAGE

This application is a U.S. National Stage Filing under 35 U.S.C. 371 from International Application No. PCT/US2015/051523, filed Sep. 22, 2015 and published in English as WO 2017/052517 on Mar. 30, 2017, which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks, although the scope of the embodiments is not limited in this respect. Some embodiments relate to primary and secondary usage of spectrum, such as shared spectrum. Some embodiments relate to spectrum access policies for shared spectrum.

BACKGROUND

A wireless network may support communication with mobile devices for services such as voice, data and others. In some cases, throughput or capacity demands for such services may provide challenges for the network. As an example, a large number of mobile devices may be connected to the network. As another example, high data rates may be desired by some of the mobile devices connected to the network. In some cases, a limited amount of available spectrum may be available, and the network may be unable to support the mobile devices in that spectrum. Accordingly, there is a general need for methods and systems of enabling communication for the mobile devices in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
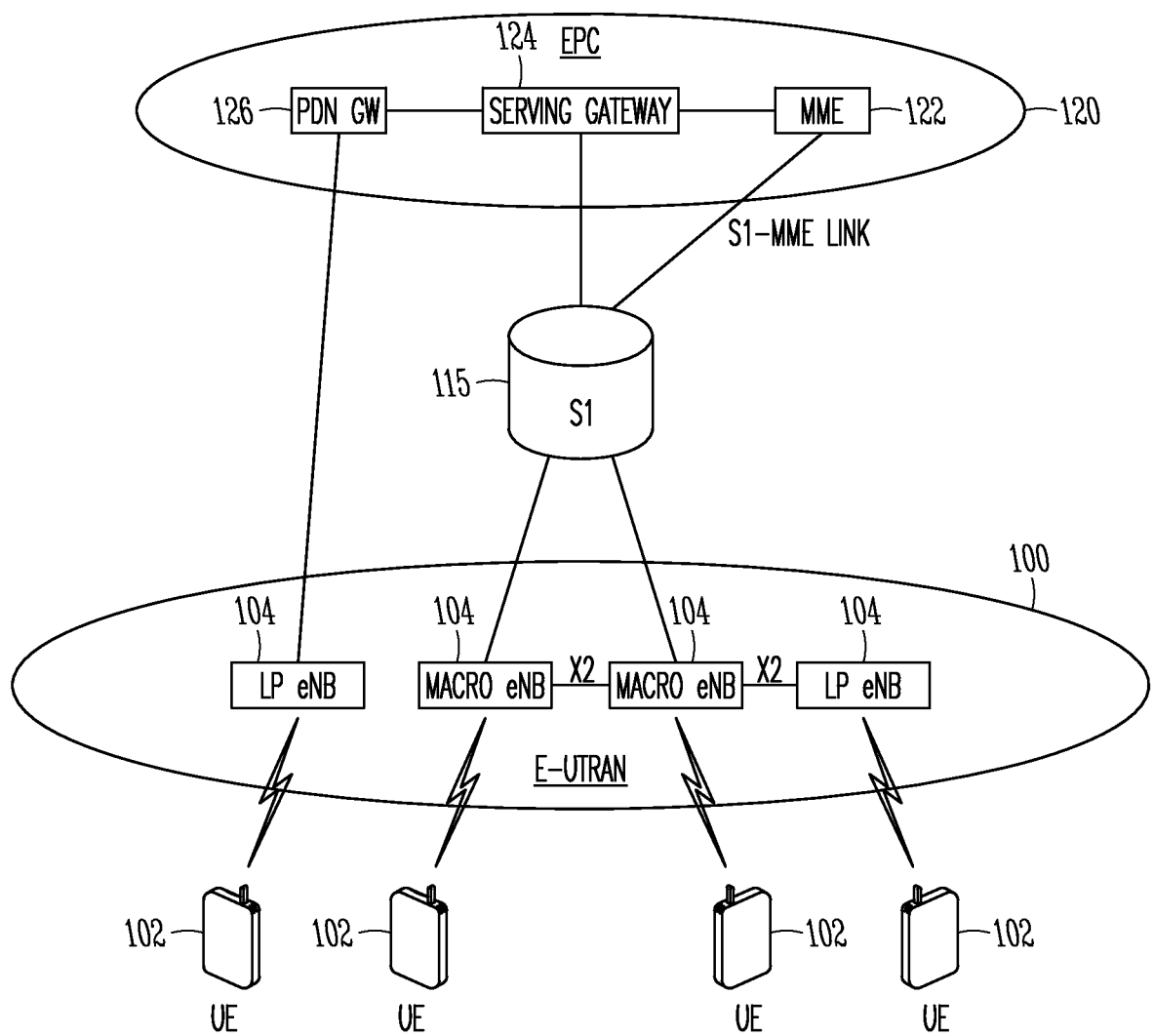
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs. In accordance with some embodiments, the eNB 104 may transmit data messages to the UE 102 and may receive data messages from the UE 102. The data messages may be exchanged in shared spectrum, in some embodiments. The eNB 104 may receive spectrum sensing information from the UEs 102 that may be based on signal strength measurements at the UEs 102. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel. Typically, downlink scheduling (e.g., assigning control and shared channel resource blocks to UEs 102 within a cell) may be performed at the eNB 104 based on channel quality information fed back from the UEs 102 to the eNB 104, and then the downlink resource assignment information may be sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
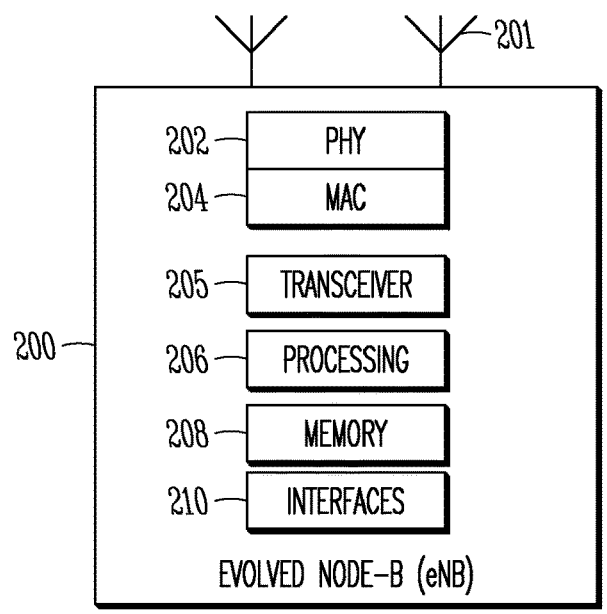
FIG. 2 is a block diagram of an Evolved Node-B (eNB) in accordance with some embodiments.

FIG. 2 is a functional diagram of an Evolved Node-B (eNB) in accordance with some embodiments. It should be noted that in some embodiments, the eNB 200 may be a stationary non-mobile device. The eNB 200 may be suitable for use as an eNB 104 as depicted in FIG. 1. The eNB 200 may include physical layer circuitry 202 and a transceiver 205, one or both of which may enable transmission and reception of signals to and from the UE 102, other eNBs or other devices using one or more antennas 201. As an example, the physical layer circuitry 202 may perform various encoding and decoding functions that may include formation of baseband signals for transmission and decoding of received signals. As another example, the transceiver 205 may perform various transmission and reception functions such as conversion of signals between a baseband range and a Radio Frequency (RF) range. Accordingly, the physical layer circuitry 202 and the transceiver 205 may be separate components or may be part of a combined component. In addition, some of the described functionality related to transmission and reception of signals may be performed by a combination that may include one, any or all of the physical layer circuitry 202, the transceiver 205, and other components or layers. The eNB 200 may also include medium access control layer (MAC) circuitry 204 for controlling access to the wireless medium. The eNB 200 may also include processing circuitry 206 and memory 208 arranged to perform the operations described herein. The eNB 200 may also include one or more interfaces 210, which may enable communication with other components, including other eNBs 104 (FIG. 1), components in the EPC 120 (FIG. 1) or other network components. In addition, the interfaces 210 may enable communication with other components that may not be shown in FIG. 1, including components external to the network. The interfaces 210 may be wired or wireless or a combination thereof.

The antennas 201 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201 may be effectively separated to take advantage of spatial diversity and the different channel characteristics that may result.

In some embodiments, the eNB 200 and/or the UE 102 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102 or eNB 200 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 102, eNB 200 or other device may include one or more of a keyboard, a display, a non-volatile memory port, multiple antennas, a graphics processor, an application processor, speakers, and other mobile device elements. The display may be an LCD screen including a touch screen.

Although the eNB 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the eNB 200 may include various components of the eNB 200 as shown in FIG. 2. Accordingly, techniques and operations described herein that refer to the eNB 200 (or 104) may be applicable to an apparatus for an eNB.

Figure 3:
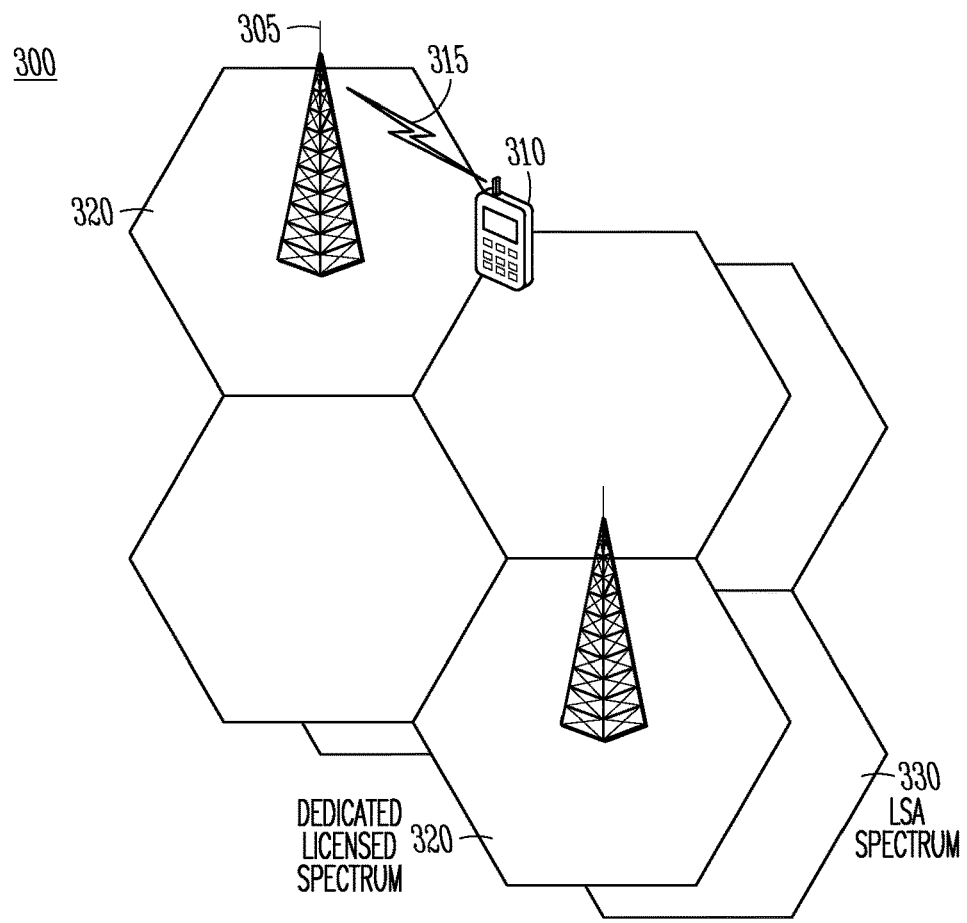
FIG. 3 illustrates an example of spectrum sharing in accordance with some embodiments.

FIG. 3 illustrates an example of spectrum sharing in accordance with some embodiments. In some embodiments, Licensed Shared Access (LSA) spectrum sharing techniques may be used, although embodiments are not limited to the use of LSA for spectrum sharing. It should be noted that embodiments are not limited to the number of eNBs 305, UEs 310, cells or other elements shown in FIG. 3. Embodiments are also not limited to the arrangement shown in FIG. 3. In addition, embodiments are not limited to the usage of eNBs 305 and UEs 310 (which may be arranged to operate according to a 3GPP LTE protocol). For instance, APs, STAs, other base station components and/or other mobile devices may be used in some embodiments.

In the spectrum sharing scenario 300, the eNB 305 may communicate with a UE 310 over the wireless link 315. As shown in FIG. 3, the top layer of cells 320 may indicate communication (between the eNB 305 and the UE 310, for instance) in dedicated licensed spectrum. The bottom layer of cells 330 may indicate communication in shared spectrum, which may be LSA spectrum in this example.

In an example of spectrum sharing using LSA techniques, a 3GPP LTE network may be operated on licensed shared basis in the 2.3-2.4 GHz frequency band which corresponds to 3GPP LTE Band 40. An incumbent (tier-1) user (or base station) may be prioritized over the licensee (tier-2) user (or base station). For instance, a mobile network operator (MNO) may be required to vacate the LSA band for a given geographic area, a given frequency range and a given period of time for which the incumbent is requiring access to the resource. In some cases, the LSA band may be combined with LTE operation in dedicated licensed spectrum through suitable Carrier Aggregation mechanisms. For instance, some legacy LTE systems may be based on FDD technology, and the 3GPP Release-12 FDD/TDD Carrier Aggregation feature may be required for a suitable combination of existing deployment with LTE LSA modes.

In an example of spectrum sharing using Spectrum Access System (SAS) techniques, a 3GPP LTE network may be operated on licensed shared basis in the 3.55-3.7 GHz frequency band which corresponds to 3GPP LTE Bands 42 and 43. In some cases, SAS may differ from LSA in that licensed spectrum slots may be only available in parts of the entire SAS band (up to 70 MHz) for so-called Primary Access License (PAL) tier-2 users. The remaining part of the spectrum, as well as unused portions of the PAL spectrum ("use-it-or-share-it" rule), may be available to a new user class called General Authorized Access (GAA) tier-3 users. This tier-3 class may not exist in the LSA system definition. GAA users may typically operate LTE Licensed Assisted Access (LSA) or WiFi type systems, and may make modifications in order to be adapted to SAS requirements. For instance, such requirements may be imposed by a governing body, such as the FCC or other, in some cases.

It should be noted that both systems, LSA and SAS, may be defined for usage in a specific frequency band. The basic operational principles of those systems, however, may be frequency agnostic in some cases, and may be straightforwardly applied to other bands. For instance, techniques may be applied to 3.5 GHz candidate bands in some cases.

Figure 4:
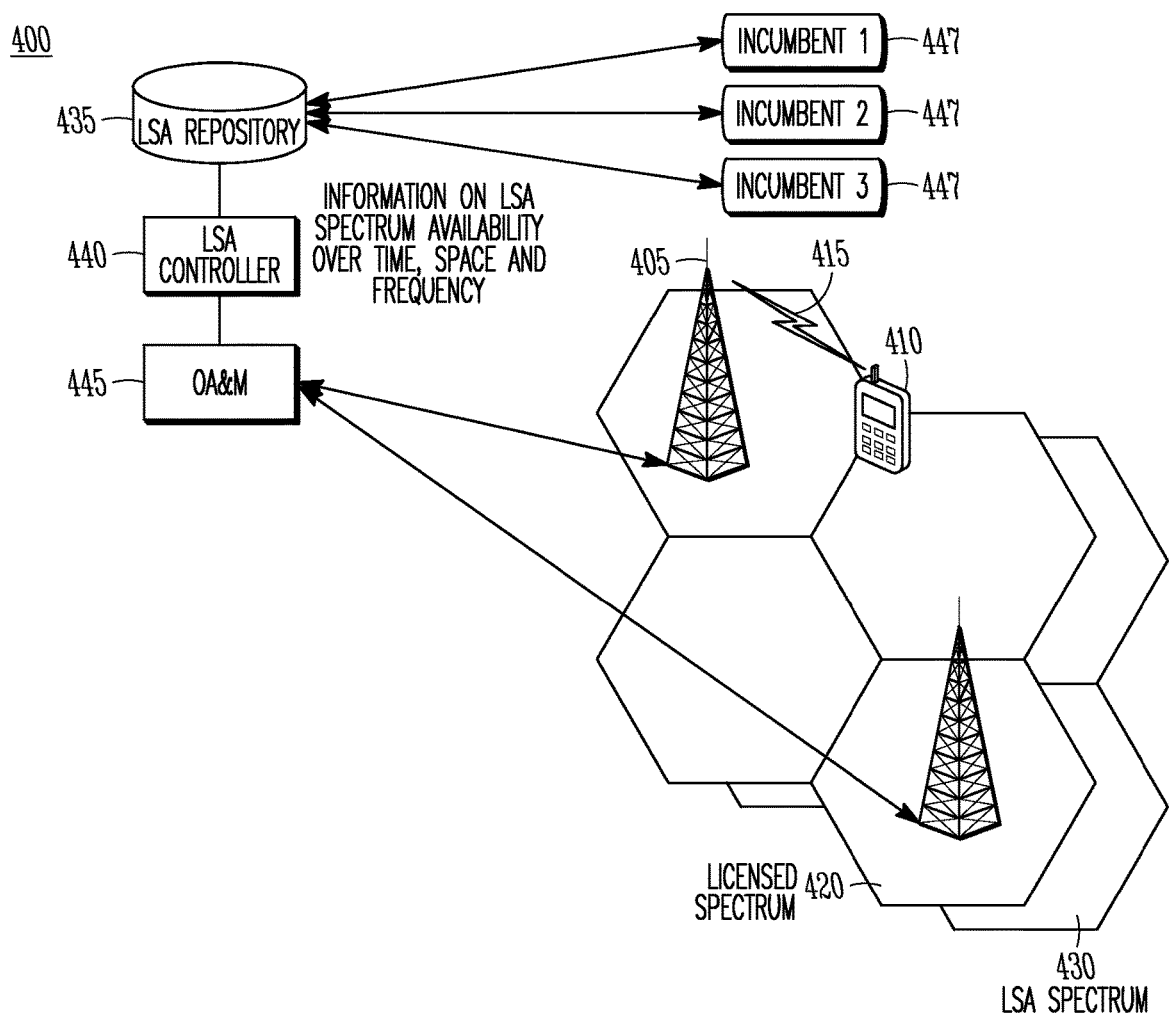
FIG. 4 illustrates an example network for a Licensed Shared Access (LSA) arrangement and an example network for a Spectrum Access System (SAS) arrangement in accordance with some embodiments.
Figure 4:
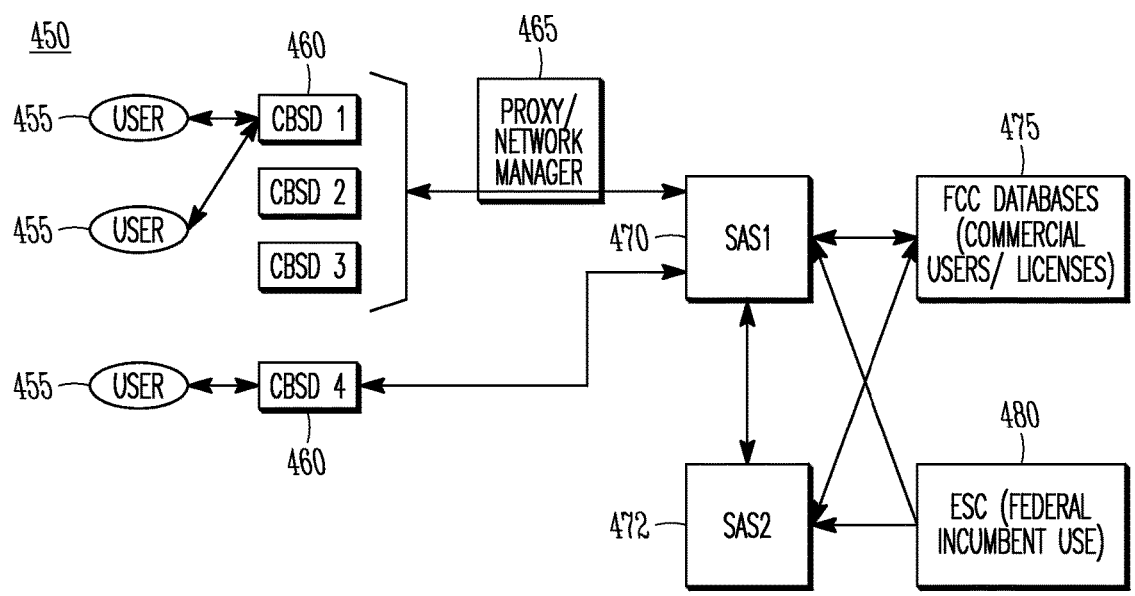

FIG. 4 illustrates an example network for a Licensed Shared Access (LSA) arrangement and an example network for a Spectrum Access System (SAS) arrangement in accordance with some embodiments. It should be noted that embodiments are not limited to the number of eNBs 405, UEs 410, base stations, mobile devices, cells or other elements shown in FIG. 4. Embodiments are also not limited to the type of components shown in FIG. 4 and/or arrangements of the components as shown in FIG. 4. In addition, embodiments are not limited to the usage of eNBs 405 and UEs 410 (which may be arranged to operate according to a 3GPP LTE protocol). For instance, APs, STAs, other base station components and/or other mobile devices may be used in some embodiments.

In the spectrum sharing scenario 400, LSA techniques may be used. The eNB 405 may communicate with a UE 410 over the wireless link 415. As shown in FIG. 4, the top layer of cells 420 may indicate communication (between the eNB 405 and the UE 410, for instance) in dedicated licensed spectrum. The bottom layer of cells 430 may indicate communication in shared spectrum, which may be LSA spectrum in the example scenario 400.

The LSA Repository 435 may be a centralized database that may be used for spectrum management in this scenario 400. The incumbent users 447 may be required to provide a-priori usage information to the LSA repository 435 (or database) on the availability of LSA spectrum over space and time. Depending on this information, the LTE system may be granted access or may be requested to vacate one or more frequency bands through control mechanisms and/or operations that may be performed (at least partly) by the LSA Controller 440. In this operational approach, sensing mechanisms may not necessarily be required to support the system for the identification of incumbent operation.

In the spectrum sharing scenario 450, SAS techniques may be used. In some embodiments, SAS may be designed to ensure coexistence with incumbent users who may not be able to provide any a-priori information to a central database. In some cases, such design considerations may differ in comparison to LSA. In some cases, an Environmental Sensing Capability (ESC) 480 component may perform sensing tasks. As a non-limiting example, the ESC 480 may be included for military applications. In some cases, spectrum access decisions for tier-3 and tier-2 users may be based at least partly on such sensing results. As non-limiting example, unlicensed systems such as Wi-Fi (802.11) or Bluetooth, may be tier-3 users.

It should be noted that embodiments may support communication according to one or more techniques and/or standards, including but not limited to a wide area radio communication technology (which may include 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin—"car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, and/or mmWave standards in general (wireless systems operating at 10-90 GHz and above such as WiGig, IEEE 802.11ad, IEEE 802.11ay. For instance, base stations, mobile devices, incumbent devices, and/or other devices may be arranged to support one or more of these technologies and/or standards in some embodiments. In addition, those devices may also be arranged to support wireless and/or wired communication that may or may not necessarily be defined by a standard.

As an example, spectrum sharing may be performed and/or implemented in the 2.3-2.4 GHz band. As another example, spectrum sharing may be performed and/or implemented in the 3.55-3.7 GHz band (US). As another example, some or all of the techniques described herein may be applicable to other frequency bands. For instance, broadband wireless communication bands below 6 GHz or mmWave bands from 6 GHz to 100 GHz may be used in some cases. In some embodiments, additional techniques may be used for spectrum sharing. For instance, techniques for accommodation of fast adaptation requirements by the incumbents may be used.

In some cases, networks may serve mission critical applications, and therefore distributed and resilient network topologies, control, and licensing models may be used and/or required. In some cases, networks may have spurious communication requirements in which an available time to serve a request may be an important criteria for feasibility of the networks. Accordingly, an available and/or required time to make a decision on whether the user is able to access a secondary spectrum resource may be designed to be as small as possible to best serve this. In some cases, networks may be capable of providing disaster relief capacity and may be able to operate when cut off to a central control point of communication. In addition, the networks may still effectively operate and manage spectrum resources in such cases. As another example, some secondary spectrum networks may require a level of secondary user co-operation, while maintaining sufficient security and anonymisation of interests and/or information of other entities. As another example, a system may be resilient, flexible and/or capable of providing supplementary connectivity for mission critical applications and sufficient capacity to manage numerous spurious requests. In addition, a capability to dynamically adapt to rapid network topology changes may be used and/or required for secondary spectrum management.

Figure 5:
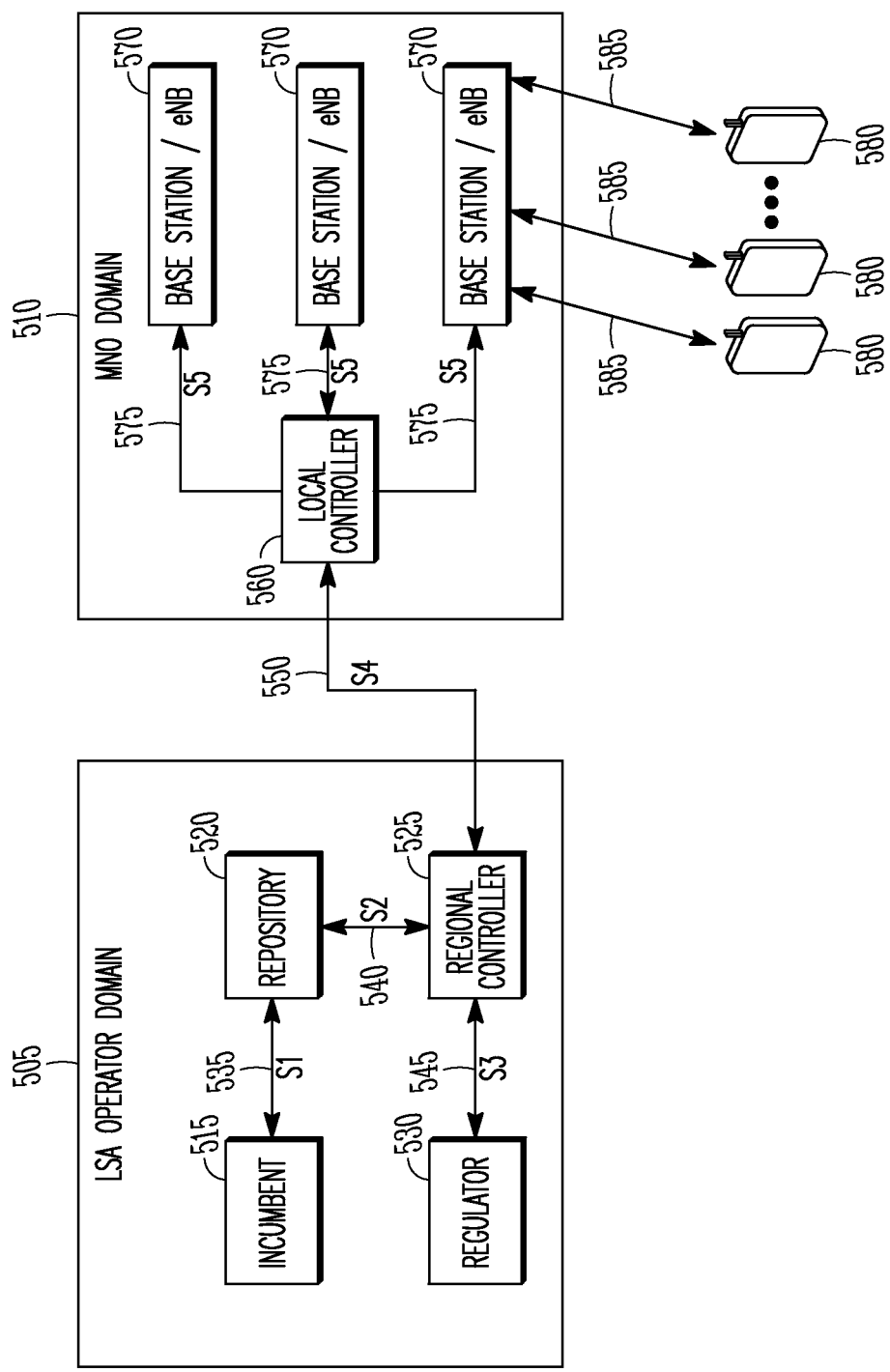
FIG. 5 illustrates an example of a Licensed Shared Access/Spectrum Access System (LSA/SAS) network in which shared spectrum may be allocated in accordance with some embodiments.

FIG. 5 illustrates an example of a Licensed Shared Access/Spectrum Access System (LSA/SAS) network in which shared spectrum may be allocated in accordance with some embodiments. The LSA/SAS network 500 may be used for allocation of shared frequency spectrum for secondary usage. In some cases, the spectrum may be used by an incumbent device for primary usage and/or priority usage. Such spectrum may be used infrequently or for a limited time period in some cases. As an example, a television channel may be off the air during an overnight time period. As another example, radar signals may be transmitted in dedicated spectrum at an infrequent rate. As will be described below, in some embodiments, the LSA/SAS network 500 may enable sharing of such spectrum by other devices, which may improve the utilization of the spectrum.

It should be noted that embodiments may use any suitable base station component, although an eNB 570 is used in the example LSA/SAS network 500 of FIG. 5. For example, an eNB, an AP, an apparatus for an eNB and/or an apparatus for an AP may be used. Accordingly, reference to an eNB 570 and discussion of an eNB 570 are not limiting and may be applicable to other base station components like those previously described. It should also be noted that embodiments may use any suitable mobile device, although a UE 580 is used in the example network 500 of FIG. 5. For example, a UE, STA, an apparatus for a UE and/or an apparatus for an STA may be used. Accordingly, reference to a UE 580 and discussion of a UE 580 are not limiting and may be applicable to other mobile devices like those previously described It should also be noted that embodiments are not limited to the number of components shown in FIG. 5. For instance, embodiments are not limited to three eNBs 570 and are also not limited to three UEs 580. Embodiments are not limited to the arrangement and/or ordering of the components. Embodiments are also not limited to usage of the interfaces shown, as the components may communicate over other interfaces in addition to, or instead of, the interfaces shown in the example LSA/SAS network 500 in FIG. 5.

In some embodiments, the eNB 570 may be configured to operate in the 3GPP network as shown in FIG. 1 and may also be configured to operate as part of the LSA/SAS network 500. Accordingly, the eNB 570 may communicate with the MME 122, serving GW 124, and PDN GW 126 as part of the operation of the 3GPP network, and may also communicate with components included in the LSA/SAS network 500 as part of the spectrum allocation operation. Communication, by the eNB 570, with components in the two networks (3GPP and LSA/SAS) may or may not be independent and/or related.

As shown in FIG. 5, various components may be configured to enable allocation of shared spectrum for primary usage and/or secondary usage. In some embodiments, some of the components may be included in a Licensed Shared Access (LSA) domain 505 and some of the components may be included in a Mobile Network Operator (MNO) domain 510. However, embodiments are not limited to the usage of these domains or other domains. In some cases, the illustration and/or usage of such domains, like for the LSA/SAS network 500 shown in FIG. 5, may serve to illustrate concepts and/or techniques described herein.

It should be noted that a split between an MNO domain and an SAS domain may also be performed in some embodiments. As an example, the SAS1 470 and/or the SAS2 472 (FIG. 4) may be used for such a split. As another example, the Proxy/Network Manager 465 (FIG. 4) may correspond to an intra-MNO portion and may manage a flow of information to the SAS1 470 (which may be a public "SASx" entity). As another example, a private component that may be operated and/or controlled by the MNO may be included in the SAS1 470, and the component may be at a same or similar operational level as the SAS1 470. The private component within the global public SAS1 470 may interact with a non-MNO portion of the SAS and may control information flow.

In the example LSA/SAS network 500, the LSA domain 505 may include one or more incumbent devices 515. In some embodiments, the incumbent device 515 may be a base station, eNB 104, access point (AP) or other device that may be operated by or controlled by a network operator. Accordingly, the incumbent device 515 may have primary access, or priority access, to at least a portion of the shared spectrum. As an example, the shared spectrum may be at least partly reserved for primary usage by one or more incumbent devices 515. The incumbent device 515 may be communicatively coupled to a repository 520 over the S1 interface 535 (which may not be related to the S1 interface 115 shown in FIG. 1). The Regional Controller (RC) device 525 may be communicatively coupled to the repository 520 over the S2 interface 540 and may be communicatively coupled to the regulator 530 over the S3 interface 545. Accordingly, the RC device 525 may be included in the LSA domain 505 in some embodiments.

In the example LSA/SAS network 500, the MNO domain 510 may include a Local Controller (LC) device 560, which may be communicatively coupled to one or more eNBs 570 (which may be base stations or other devices) over S5 interfaces 575. In some embodiments, the RC device 525 may inform the LC device 560 of shared spectrum that is available for allocation, by the LC device 560, to the eNBs 570. As a non-limiting example, the eNBs 570 may be included in a Local Controller Control Group (LCCG) that may be assigned to and/or under control of the LC device 560 for the allocation of the shared spectrum.

The eNBs 570 may communicate with one or more mobile devices (which may be UEs 580 or other devices)

over wireless links 585. Such communication may be performed according to one or more standards, such as 3GPP, IEEE 802.11 or other. However, embodiments are not limited to communication according to a standard, and any suitable communication techniques may be used in addition to, or instead of, communication according to standards. In some embodiments, the LC device 560 and the RC device 525 may be communicatively coupled over the S4 interface 550. Accordingly, the S4 interface 550 may link the LSA domain 505 and the MNO domain 510 in some cases.

In some embodiments, the RC device 525 and the LC device 560 may operate as part of a two-tier controller configuration for the network 500 to perform operations related to allocation and/or management of the shared spectrum. Such a two-tier controller configuration may be different, in some aspects, from centralized controller configurations. As an example, the RC device 525 may be owned, operated and/or controlled by an LSA/SAS operator. As another example, the LC device 560 may be owned, operated and/or controlled by an MNO. As another example, either or both of the RC device 525 and the LC device 560 may be owned by third parties, which may or may not be the same or related to each other. In some cases, the LC device 560 may be owned and/or operated by the MNO or by a third party to anonymize MNO network configurations and details of how the MNO (and other MNOs in some cases) may utilize secondary spectrum available to them according to one or more licensing agreements.

As another example, communication between the LC device 560 and the RC device 525 over the S4 interface 550 (that may link the LSA domain 505 and the MNO domain 510) may be performed according to a group of integrity, security, and authority requirements and/or guidelines. The group may be based on, or similar to, another group of integrity, security, and authority requirements and/or guidelines (such as a reference group) that may be applicable to communication between commonly owned or commonly operated components. That is, although the LC device 560 and the RC device 525 may be owned and/or operated by different entities, communication between them may be performed as if the LC device 560 and the RC device 525 were commonly owned and operated in some cases. Accordingly, a chain of trust may be defined and maintained, in which RC devices 525 may trust information sent from LC devices 560 and the LC devices 560 may trust information sent from RC devices 525. In some embodiments, procedures to establish and maintain such trust may be mandatory or may be a requirement.

The information sent from the LC devices 560 may include spectrum sensing information, radio environment map (REM) information, information related to spectrum engagement and/or evacuation, or other suitable information. The information sent from the RC devices 525 may include spectrum access policy information, reconfiguration information related to neighboring LC devices 560 (of which a particular LC device may or may not have visibility or knowledge). These examples of information that may be exchanged between RC devices 525 and LC devices 560 are described in more detail herein.

In some embodiments, a spectrum access policy (or a localized spectrum access policy) may define how shared spectrum may be allocated for secondary usage to an LCCG. The policy may be based on or may depend on particular licensing agreements of the shared spectrum and/or a frequency band that includes the shared spectrum. As an example of a component of an access policy, secondary access to the shared spectrum may be limited to cases in which a trigger is sent from the incumbent device 515 to the RC device 525 and further to the LC device 560 to indicate that the spectrum resources are available or unavailable. As another example of a component of an access policy, a sensing period may be performed and/or required by the eNB 570 before the secondary access to the spectrum is granted to the eNB. Accordingly, an absence of incumbent 515 activity may be ensured and/or enabled. In some cases, the performance of the sensing period may be enforced by the LC device 560. As another example, an access policy may include and/or be defined by any number of components, including but not limited to frequency bands of the shared spectrum, geographical regions in which the shared spectrum may be available, times of day during which the shared spectrum may be available and/or unavailable, information related to whether sensing may be required before access to the spectrum may be granted, maximum and/or minimum access time durations for the shared spectrum, maximum transmit power limits for the shared spectrum, and secondary user owner agreements for the shared spectrum. These examples are not limiting, however, as the access policy may include any or all of the above and may also include other components in some cases.

It should be noted that the shared spectrum may operate according to a state in terms of availability or unavailability for the secondary usage. As an example of explicit availability, the incumbent may indicate that the shared spectrum is available for the secondary usage. As an example implicit availability, it may be determined that the shared spectrum is available for the secondary usage based at least partly on conditions of a policy being satisfied. In this case, it may not be required that the incumbent indicate the spectrum availability. As an example of explicit unavailability, the incumbent may indicate that the shared spectrum is unavailable for the secondary usage or may indicate an intention to reclaim the shared spectrum for primary usage. As an example implicit unavailability, it may be determined that the shared spectrum is unavailable for the secondary usage based at least partly on conditions of a policy. In this case, it may not be required that the incumbent indicate the spectrum unavailability.

In some embodiments, when a potential secondary user (such as a eNB 570) is notified of available shared spectrum, the secondary user may decide to engage the shared spectrum. The secondary user may also decide to leave the shared spectrum unengaged for another secondary user to utilize the shared spectrum or for anonymization or obfuscation of the network configuration.

In some embodiments, engaged spectrum may be declared available and the secondary user may begin its temporary lease of the shared spectrum. In some cases, the secondary user may first notify that it intends to engage the spectrum before the access may occur. After the spectrum is engaged, it may be required that the secondary user unengaged the spectrum before the state of the spectrum may be permitted to change. In some cases, the unengagement of the spectrum may be required before the incumbent 515 may retake the spectrum for primary usage.

In some embodiments, the RC device 525 may assign and/or may be responsible for assigning spectrum access policies and/or rules to LC devices 560 connected to, or controlled by, the RC device 525. The LC devices 560 may communicate, to the RC device 525, information related to spectrum allocation, such as which portions of the shared spectrum have been allocated. However, the LC devices 560 may refrain from identifying, to the RC device 525, the particular eNBs 570 (or eNBs 104) to which the portions have been assigned. That is, identifiers of those eNBs 570 may be withheld from the RC device 525 in some cases.

In some cases, operations performed by the RC device 525 for the establishment of the local spectrum access policy may enable autonomy of spectral reuse for the shared spectrum, in which a set of rules may be defined before secondary spectrum access can be performed. The RC device 525 may provide different levels or types of control for different frequency bands, in some cases. As an example, allocation of a particular frequency band for secondary access may include signaling of the availability of the frequency band by the incumbent device 515 before the secondary spectrum access may be enabled, by the RC device 525.

In some embodiments, the RC device 525 may have knowledge of the geographical coverage area spanned by an LCCG of eNBs 570 assigned to a particular LC device 560. Such knowledge may be cross-referenced and/or compared with information included or maintained at the repository 520 to determine which licensing agreement(s) may be applicable and/or in effect within the particular geographical coverage area. A spectrum access policy for the LC device 560 may be determined and may be communicated to the LC device 560. Accordingly, a local spectrum access policy may be established for the LC device 560.

In some embodiments, the RC device 525 may serve a geographic region that may include one or more local regions, which may be served by one or more LC devices 560. As an example, each local region may be served by an LC device 560, although embodiments are not limited to this example. The RC device 525 may manage, enforce and/or distribute licensing agreements that may be applicable to the geographic region served by the RC device 525. For instance, the RC device 525 may convert one or more licensing agreements for the shared spectrum into one or more localized spectrum access policies for one or more LC devices 560. As a non-limiting example, a localized spectrum access policy may be communicated, by the RC device 525, for each LC device 560, and the localized spectrum access policies may or may not be different.

In some embodiments, the RC device 525 may be aware of events and/or states of multiple LC devices 560, such as interference experienced by a particular LC device 560 or an LC device 560 failing or going down. The RC device 525 may perform operations in response to those and other events, such as modification of localized spectrum access policies.

In some embodiments, the LC device 560 may be notified, by the RC device 525, of an availability and/or unavailability of shared spectrum resources. In addition, the RC device 525 may communicate a localized spectrum access policy to the LC device 560. As an example, the RC device 525 may inform the LC device 560 that the shared spectrum is available or that the incumbent device 515 intends to retake the shared spectrum. Accordingly, the LC device 560 may determine how the eNBs 570 are to be allocated the shared spectrum (or one or more portions of it) for secondary usage. The allocation may be determined and/or performed in accordance with the localized spectrum access policy, in some cases.

In some embodiments, the eNBs 570 may be included in a Local Controller Control Group (LCCG) of eNBs 570 for the LC device 560. Accordingly, the LC device may allocate the shared spectrum for secondary usage for the eNBs 570 in the LCCG and may also manage the secondary usage. As an example, the LCCG may include a group of eNBs 570 that have overlapping cells. As another example, the eNBs 570 in the LCCG may be located within a particular geographical region where coordination between the cells may be desirable or beneficial. As another example, some or all of the eNBs 570 may not be allocated shared spectrum in some cases, but may still provide spectrum sensing information and/or REM information to the LC device 560.

Embodiments are not limited to any particular number of eNBs 570 in the LCCG. However, in some cases, the number of eNBs 570 may be selected and/or designed to be small enough such that the LC device 560 does not cause a processing bottleneck. For instance, the LC device 560 may be required, in some cases, to perform operations in a timely manner, such as real-time or approximately real-time. The operations may include, but are not limited to, making decisions regarding spectrum access, exchanging of commands and notifications with the RC device 525 and/or the eNBs 570, and processing spectrum sensing information. Accordingly, the number of eNBs 570 in the LCCG may be limited for performance reasons, in some cases. In some embodiments, geographic areas that may be densely populated with eNBs 570 may utilize multiple LC devices 560 and/or multiple LCCGs. As such, sufficient distributed processing capability for REM computation and other operations, such as those described above, may be enabled and/or ensured.

In some embodiments, the LC devices 560 may enforce or may be responsible for enforcing a localized spectrum access policy, which may be outlined by the RC device 525. As an example, a localized spectrum access policy may include rules, requirements and/or guidelines for allocation of the shared spectrum, by an LC device 560, to one or more eNBs 570 served by the LC device 560. Accordingly, decisions made by the LC device 560 for the allocation of the shared spectrum may be communicated to the RC device 525 to ensure that the allocation is performed in accordance with and/or in compliance with the localized spectrum access policy. As another example, the LC device 560 may be responsible for allocation of the shared spectrum to one or more co-located eNBs 570 and/or cells in accordance with the particular localized spectrum access policy for the LC device 560.

In some embodiments, the LC device 560 may create or may be responsible for creating a radio environment map (REM) that may be based on secondary usage of the shared spectrum by the eNBs 570 in the LCCG. The REM may assist and/or enable the LC device 560 to make spectrum access decisions in accordance with the localized spectrum access policy. For instance, collection of spectrum sensing information from the eNBs 570 in the LCCG may be required, by the policy, before access to the shared spectrum for the secondary usage may be granted.

In some embodiments, the LC device 560 may communicate spectrum access decisions to the RC device 525 to enable the RC device 525 to ensure and/or determine compliance with the localized spectrum access policy. Accordingly, the RC device 525 may be notified of which particular portions of the shared spectrum are engaged and/or allocated for the secondary usage. However, information related to the particular eNBs 570 to which the portions are allocated may be withheld from the RC device 525, which may enable anonymization of the secondary usage. In addition, the RC device 525 may make modifications to the localized spectrum access policy based on the received information related to the allocation in some cases. For instance, when the spectrum access decisions reported by the LC device 560 are not in compliance with the policy, the RC device 525 may make such modifications.

In some embodiments, messages may be sent over the S4 interface 550 according to a priority level. That is, an exchanging of some messages may be prioritized over an exchanging of other messages. As an example, messages related to retaking of the shared spectrum by the incumbent for primary usage may be exchanged according to a high priority. As another example, messages related to availability and/or unavailability of the shared spectrum for secondary usage may also be exchanged according to a high priority. As another example, spectrum access policy updates may be exchanged according to a low priority or a priority that may be lower than the high priority previously described. Although not limited as such, the priority may be based on performance factors and/or requirements. For instance, high priority messages may require or may benefit from a relatively low latency.

In some embodiments, the S4 interface 550 may be used for reporting of spectrum access decisions from the LC device 560 to the RC device 525. Such decisions may be included in messages that also may indicate other information such as frequency band(s) currently engaged by the LCCG. As an example, the RC device 525 may request REM data from the LC device 560 to enable the RC device 525 to construct a regional REM. Such requests may be made in accordance with particular licensing agreements, in some cases. The regional REM may enable and/or assist in network planning and may improve secondary spectrum allocation. For instance, localized spectrum access policies may be modified and/or refined based at least partly on the regional REM.

In some embodiments, information made visible to the RC device 525 by the LC device 560 may be limited to REM information for the LCCG and/or information related to when spectrum is engaged for secondary usage by the LCCG. Accordingly, anonymization of the MNO domain 510 from the LSA domain 505 may be enabled. In some embodiments, the spectrum information made visible to the LC device 560 by the RC device 525 may be limited. For instance, such information may exclude information related to other RC devices 525, the repository 520, and/or other incumbents communicatively coupled to the LSA domain 505. Accordingly, anonymization of the LSA domain 505 from the MNO domain 510 may be enabled.

In some embodiments, the RC device 525 may trust information sent from the LC device 560 and the LC device 560 may trust information sent from the RC device 525. In some cases, such trust may be mandatory and/or required. In some embodiments, commands from the RC device 525 to the LC device 560 may be immutable, and eNBs 570 included in the RCCG may be forced, in some cases, to comply with such commands, thus ensuring and/or enabling a synchronization of policy updates. Accordingly, a chain of trust may be established in which MNO configurations may be anonymized and negative impacts on services provided to the MNO domain 505 may be reduced.

In some embodiments, the LC device 560 may know which eNBs 570 of the LCCG are connected to the LC device 560 and locations of those eNBs 570. Accordingly, allocation of shared spectrum to the eNBs 570 according to license agreements that may be based at least partly on the locations. Spectrum sensing information may be transmitted over the S5 interface 575 to the LC device 560 from the eNBs 570, which may request the information from connected UEs 102 or may interrogate the UEs 102 for the information. In some embodiments, the spectrum sensing information may include received signal strength and/or geographical location information of the UEs 102. As an example, the spectrum sensing information may include additional information about the UEs 102. As another example, the spectrum sensing information may be limited and/or restricted to include the received signal strength and/or geographical location information of the UEs 102.

In some cases, granularity for the spectrum sharing may be provided, as the allocation of the shared spectrum may be focused according to a per cell basis. In some cases, knowledge of cell overlap may also be provided, by the eNBs 570 to the LC device 560, over the S5 interface 575. In some cases, the eNBs 570 may not necessarily be aware of the localized spectrum access policy and/or spectrum environment, and may be signaled by the LC device 560 when shared spectrum is available and/or unavailable for the secondary access. In some cases, sensing information may be requested from the eNBs 570 by the LC device 560 before the secondary access to the shared spectrum may be made available to the eNBs. For instance, this may be a requirement of a localized spectrum access policy.

In some embodiments, a eNB 570 may inform the LC device 560 when the eNB 570 has engaged an available portion of the shared spectrum. It should be noted that when a portion is "engaged" by the eNB 570, the eNB may not necessarily be accessing or using the portion. In such cases, a current lease for the portion may be transferred to the eNB 570 for the secondary usage.

In some embodiments, engagement of the shared spectrum may not be limited to immediate engagement upon notification of the availability of the shared spectrum. As a non-limiting example, an opportunity to engage the shared spectrum may be available until the incumbent 515 intends to retake the shared spectrum for primary usage. In some embodiments, the eNB 570 may engage the shared spectrum (or decide to use it) according to a random engagement period, which may be selected by the eNB 570 using any suitable technique. Accordingly, the random engagement period may enable obfuscation of access strategies of the eNB 570 in some cases.

In some embodiments, the RC device 525 may perform or may be responsible for performing various operations, including any or all of managing incumbent 515 requests for retaking of shared spectrum, signaling the LC device 560 of such requests, confirming evacuation of the shared spectrum, notifying the LC device 560 of sharing agreements, notifying the LC device 560 of whitespace opportunities that may be signaled to the RC device 525 by the incumbent 515 and/or repository 520, updating policies, receiving and forwarding of sharing agreement modifications, requesting REMs from the LC device 560, constructing RCCG REM for connected LC devices 560 for spectrum optimization, receiving spectrum access decisions from the LC device 560, evaluating the access decisions, adding and/or removing the LC device 560 from the RCSA Regional Controller Service Area (RCSA), and reconfiguring and/or optimizing LC device 560 resource distribution. These example operations are not limiting, however, as the RC device 525 may also perform or be responsible for performing other operations in addition to any or all of the example operations. In some cases, the RC device 525 may have limited knowledge or no knowledge of the owner of the eNBs 570, the type of access technology being used for the eNB 570 or how many eNBs 570 are connected to the LC device 560 (or in the LCCG). In some cases, the RC device 525 may have knowledge of a geographical area covered by the LCCG without further granularity.

In some embodiments, the LC device 560 may perform or may be responsible for performing various operations, including any or all of deciding whether to inform eNBs 570 of availability of shared spectrum for secondary usage, sending spectrum access decisions to the RC device 525, notifying eNBs 570 of availability of shared spectrum for secondary usage, signaling the spectrum availability based on policy and/or eNB 570 capabilities, sending and/or constructing REMs for the LCCG, receiving and/or requesting spectrum sensing information, adding and/or removing eNBs 570 from the LCCG, and notifying the RC device 525 of whether the shared spectrum is engaged or unengaged for the LCCG. These example operations are not limiting, however, as the LC device 560 may also perform or be responsible for performing other operations in addition to any or all of the example operations. In some cases, the LC device may have visibility and/or knowledge of eNBs 570 and/or cells in the LCCG. As an example, such information may include, but is not limited to, a serviceable cell area for the eNBs 570, owners of the eNBs 570, operational frequencies and/or capabilities of the eNBs 570, and other information.

Figure 6:
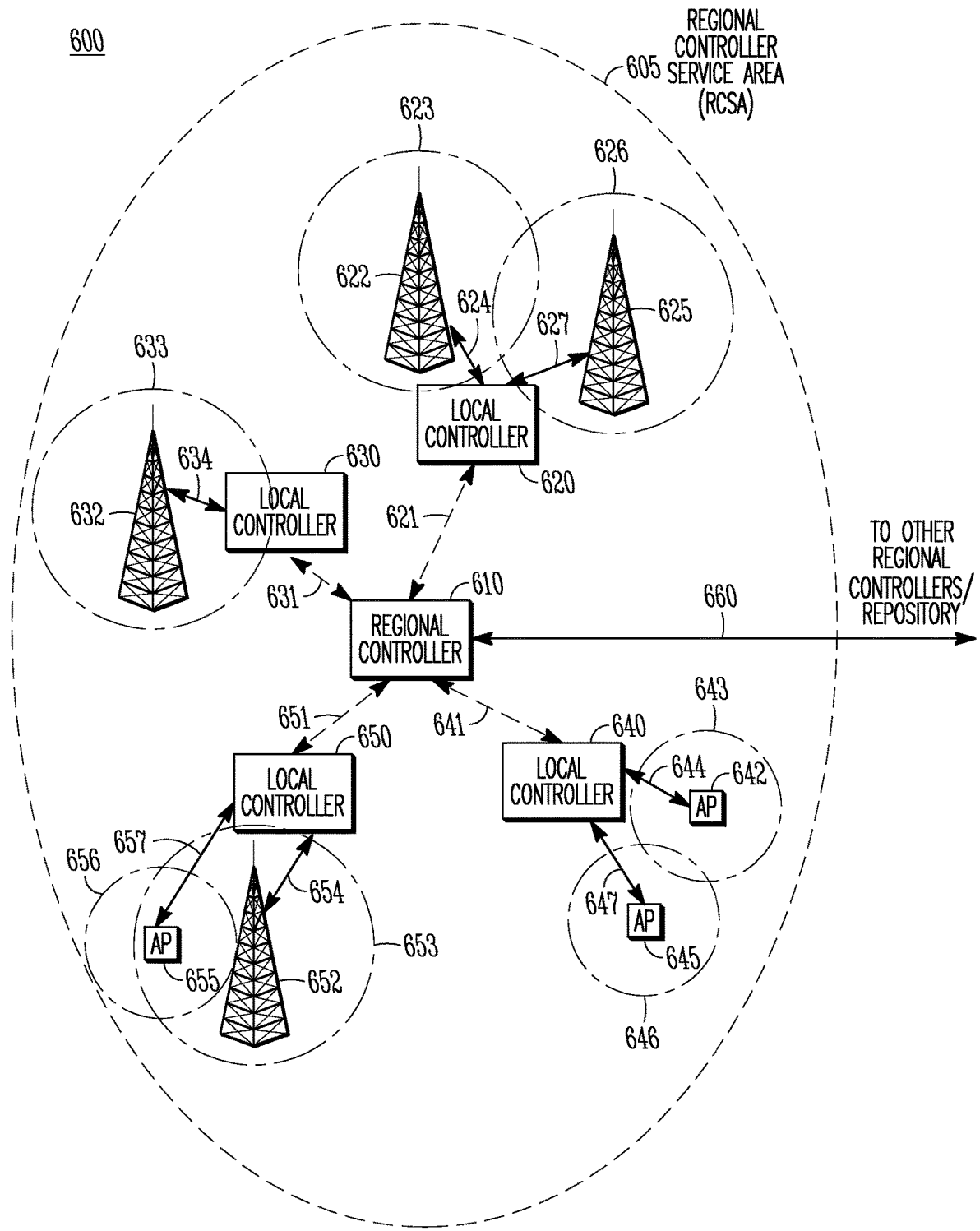
FIG. 6 illustrates an example of a scenario in which eNBs and access points (APs) may be allocated shared spectrum in accordance with some embodiments.

FIG. 6 illustrates an example of a scenario in which eNBs and access points (APs) may be allocated shared spectrum in accordance with some embodiments. Although the example scenario 600 may illustrate some or all of the concepts and/or techniques described herein, embodiments are not limited to the example scenario 600. For instance, embodiments are not limited to the number, type, or arrangement of components shown in the example scenario 600.

In the example scenario 600, the Regional Controller (RC) device 610 may perform operations for allocation of shared spectrum within a Regional Controller Service Area (RCSA) 605. The RC device 610 may communicate with Local Controller (LC) devices 620, 630, 640, and 650 over S5 interfaces 621, 631, 641, and 651, respectively. As an example, the LC device 620 may allocate at least a portion of the shared spectrum to the two eNBs 622, 625 and may communicate with them over S5 interfaces 624 and 627, respectively. The eNB 622 may operate according to the coverage area 623 and the eNB 625 may operate according to the coverage area 626. That is, UEs 102 or mobile devices 580 (FIG. 5) in those coverage areas 623, 626 may communicate with the eNBs 622, 625 over the shared spectrum (or other spectrum in some cases).

Additional non-limiting examples are shown in FIG. 6. The LC device 630 may allocate at least a portion of the shared spectrum to the eNB 632. The LC device 640 may allocate at least a portion of the shared spectrum to the APs 642, 645. The LC device 650 may allocate at least a portion of the shared spectrum to the eNB 652 and/or the AP 655. These examples are not limiting, however, as any number of LC devices may be used for the RCSA 605 and/or RC device 610. In addition, the LC devices (such as 620, 630, 640, 650 or others) may be configured to communicate with any number of base stations, eNBs and/or APs for the allocation of the shared spectrum.

As an example, the RC device 610 may serve as a centralized controller for the RCSA 605. Accordingly, coordination between neighboring LC devices (such as 620-650) may be enabled without those LC devices interacting with each other or being required to interact with each other. As an example, the LC devices in the RCSA 605 may be able to remain anonymous to each other, in some cases. The RC device 610 may receive information from the LC devices 620-650 and may aggregate and/or process the information as part of spectral reuse planning. For instance, the RC device 610 may determine a radio environment map (REM) for the LC devices 620-650 based on the received information. The information and/or the REM may be used, in some cases, to refine the localized spectrum access policies for spectral resource planning and/or optimization.

In some embodiments, the RC device 610 may forward a request, by the incumbent device 515, to retake the shared spectrum or a portion of the shared spectrum. That is, the RC device 610 may be informed that the incumbent device 515 intends to begin a primary usage of the shared spectrum, and the RC device 610 may inform one or more of the LC devices 620-650 of the intention. For instance, the shared spectrum may be allocated during an inactivity period of the incumbent device 515, and the incumbent device 515 may communicate an intention to reestablish primary usage of the shared spectrum.

In addition, the RC device 610 may communicate with other RC devices and/or repositories over interfaces 660, which may include S2 interfaces and/or S3 interfaces previously described (FIG. 5).

Figure 7:
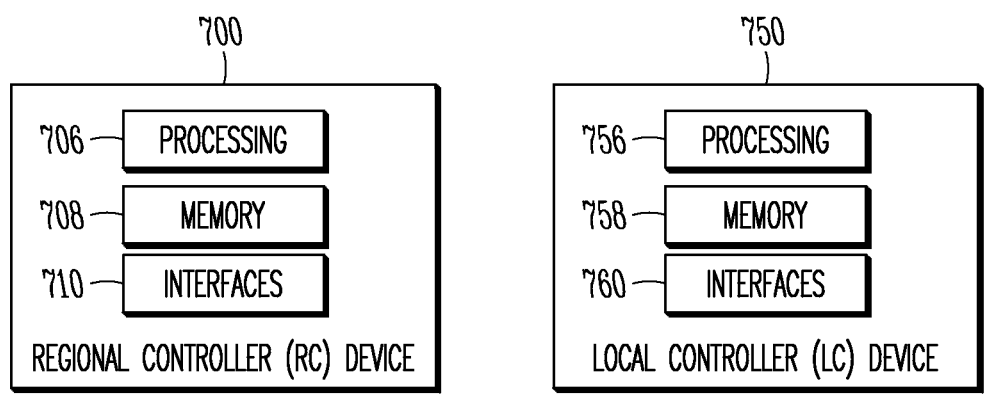
FIG. 7 illustrates example block diagrams of a Regional Controller (RC) device and a Local Controller (LC) device in accordance with some embodiments.

FIG. 7 illustrates example block diagrams of a Regional Controller (RC) device and a Local Controller (LC) device in accordance with some embodiments. The RC device 700 may be suitable for use as an RC device 525 as depicted in FIG. 5. The LC device 750 may be suitable for use as an LC device 560 as depicted in FIG. 5. The RC device 700 may include processing circuitry 706 and memory 708 arranged to perform the operations described herein. The RC device 700 may also include one or more interfaces 710, which may enable communication with other components, including the LC device 750, components in the LSA domain 505 and/or other components. The interfaces 710 may be wired or wireless or a combination thereof. The LC device 750 may include processing circuitry 756 and memory 758 arranged to perform the operations described herein. The LC device 750 may also include one or more interfaces 760, which may enable communication with other components, including the RC device 700, components in the MNO domain 510 and/or other components. The interfaces 760 may be wired or wireless or a combination thereof.

Although the RC device 700 and the LC device 750 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the RC device 700 may include various components of the RC device 700 as shown in FIG. 7. In some embodiments, an apparatus used by the LC device 750 may include various components of the LC device 750 as shown in FIG. 7. Accordingly, techniques and operations described herein that refer to the RC device 700 and/or the LC device 750 may be applicable to an apparatus for an RC device 700 and/or an apparatus for an LC device 750.

Figure 8:
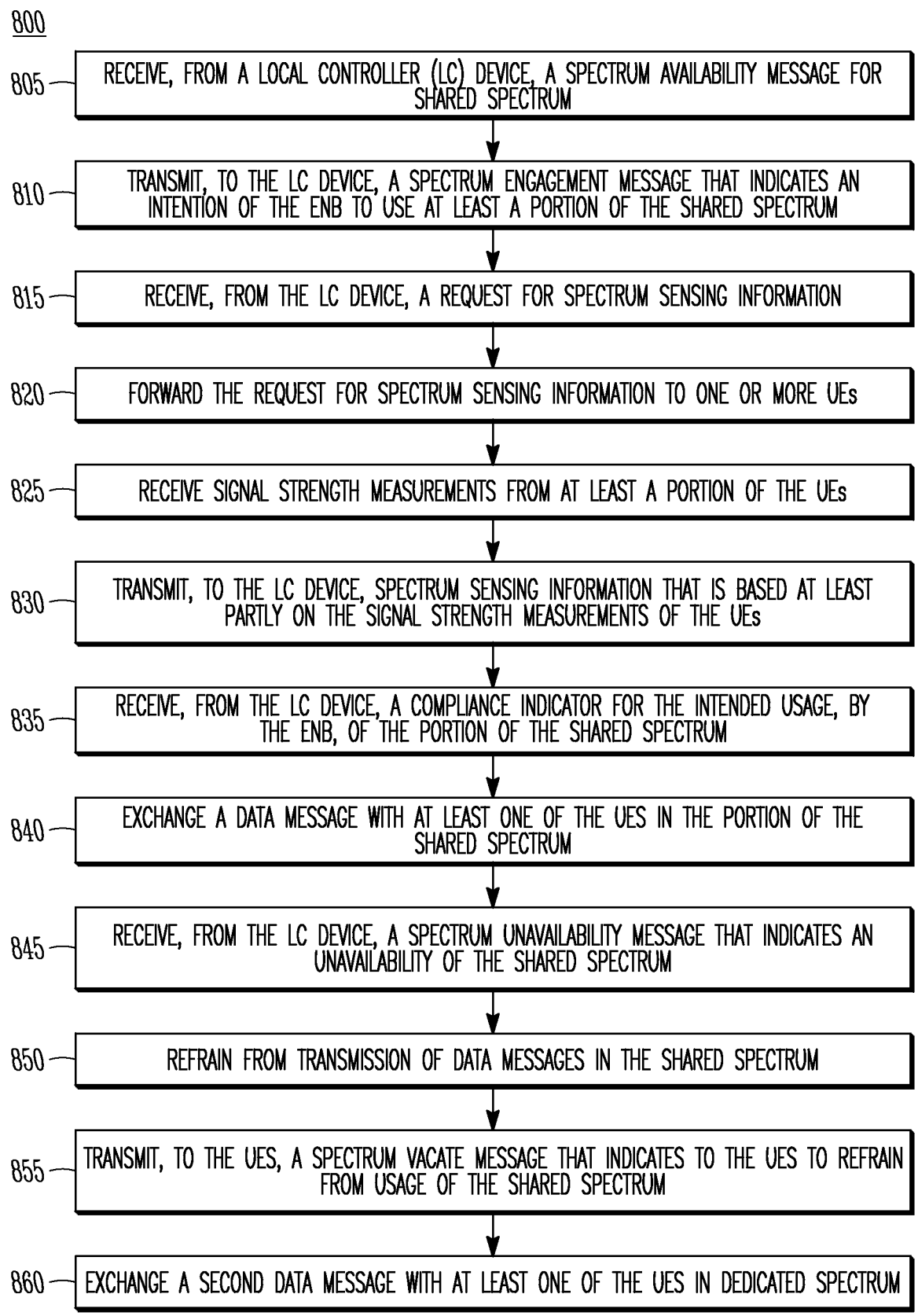
FIG. 8 illustrates the operation of a method of allocation of shared spectrum in accordance with some embodiments.

FIG. 8 illustrates the operation of a method of allocation of shared spectrum in accordance with some embodiments. It is important to note that embodiments of the method 800 may include additional or even fewer operations or processes in comparison to what is illustrated in FIG. 8. In addition, embodiments of the method 800 are not necessarily limited to the chronological order that is shown in FIG. 8. In describing the method 800, reference may be made to FIGS. 1-7 and 9-11, although it is understood that the method 800 may be practiced with any other suitable systems, interfaces and components.

In addition, while the method 800 and other methods described herein may refer to eNBs 104 or UEs 102 operating in accordance with 3GPP or other standards, embodiments of those methods are not limited to just those eNBs 104 or UEs 102 and may also be practiced on other mobile devices, such as a Wi-Fi access point (AP) or user station (STA). In addition, the method 800 and other methods described herein may be practiced by wireless devices configured to operate in other suitable types of wireless communication systems, including systems configured to operate according to various IEEE standards such as IEEE 802.11. In addition, while the method 800 and other methods described herein may refer to LC devices 560 and/or RC devices 525 that may operate in a Licensed Shared Access (LSA) network, embodiments are not limited to those devices. In some embodiments, the method 800 may be practiced by or may use other controller devices in addition to, or instead of, the LC devices 560 and/or RC devices 525. The method 800 may also refer to an apparatus for a UE 102, eNB 104, LC device 560, RC device 525 or other device described above.

At operation 805 of the method 800, the eNB 570 may receive, from the LC device 560, a spectrum availability message for shared spectrum. In some embodiments, the shared spectrum message may indicate an availability of the shared spectrum (or one or more portions of the shared spectrum) for secondary usage by the eNB 570 for communication with one or more User Equipments (UEs) 580. As an example, the availability may be based at least partly on an inactivity condition for one or more incumbent devices in the shared spectrum. As another example, the availability may be based at least partly on one or more scheduled periods of inactivity for the incumbent devices in the shared spectrum. As another example, the inactivity condition may be related to a predetermined threshold of activity and/or interference. For instance, the inactivity condition may occur when a level of interference to an incumbent is below the threshold. As another example, the inactivity condition may be limited to a geographic area. For instance, the geographic area may include a zone, such as an Exclusion, Restriction, Protection zone or other zone.

At operation 810, the eNB 570 may transmit, to the LC device 560, a spectrum engagement message that may indicate an intention of the eNB 570 to use at least a portion of the shared spectrum. It should be noted that embodiments are not limited to the usage of the spectrum availability message and/or the spectrum engagement message for indication of the information in operations 805 and 810, as other suitable messages and/or indicators may be used in some cases.

In some embodiments, the shared spectrum may be at least partly reserved for primary usage by one or more incumbent devices (such as other eNBs 570), and the availability of the shared spectrum for the secondary usage may be based at least partly on the primary usage. As an example, the primary usage of the shared spectrum may be prioritized, by the network, over the secondary usage of the shared spectrum. As another example, the availability of the shared spectrum for the secondary usage may be restricted to inactivity periods of the incumbent devices. As another example, an availability of the shared spectrum for the secondary usage may be based at least partly on an inactivity condition of the incumbent devices. As another example, an unavailability of the shared spectrum for the secondary usage may be based at least partly on an activity condition of the incumbent devices.

At operation 815, the eNB 570 may receive, from the LC device 560, a request for spectrum sensing information. The eNB 570 may forward the request to one or more UEs 580 at operation 820. It should be noted that embodiments are not limited to forwarding of the specific request from the LC device. For instance, the eNB 570 may request the spectrum sensing information from the UEs 580 using any suitable technique, and may do so based on or in response to reception of the request from the LC device 560.

At operation 825, the eNB 570 may receive signal strength measurements from at least a portion of the UEs 580. In some embodiments, the eNB 570 may also receive geographic location information from the UEs 580. It should be noted that such information may be exchanged between the eNB 570 and the UEs 580 based on or in response to the request from the eNB 570 to the UEs 580, but embodiments are not limited as such. For instance, the UEs 580 may transmit the information according to a schedule.

At operation 830, the eNB 570 may transmit, to the LC device 560, spectrum sensing information that is based at least partly on the signal strength measurements of the UEs 580. As an example, an average signal strength measurement of the UEs 580 may be determined by the eNB 570 and may be included in the spectrum sensing information. As another example, the spectrum sensing information may include other statistical measurements based on the signal strength measurements, such as histograms or other. As described herein, the spectrum sensing information transmitted to the LC device 560 may be anonymized or obfuscated by the eNB 570, and may therefore exclude some information. As an example, the spectrum sensing information transmitted to the LC device 560 may exclude the particular signal strength measurements and identifiers of the UEs.

At operation 835, the eNB 570 may receive, from the LC device 560, a compliance indicator for the intended usage, by the eNB 570, of the shared spectrum (or one or more portions of it). At operation 840, the eNB 570 may exchange a data message with at least one of the UEs 580 in the portion of the shared spectrum. That is, the eNB 570 may receive one or more data messages (or other messages) from at least one of the UEs 580 and/or may transmit one or more data messages (or other messages) to at least one of the UEs 580 in the shared spectrum. Accordingly, the data messages may be exchanged by the eNB 570 and the UEs 580 as part of secondary usage of the shared spectrum.

At operation 845, the eNB 570 may receive, from the LC device 560, a spectrum unavailability message that may indicate an unavailability of the shared spectrum. As an example, the unavailability may be based at least partly on activity of one or more incumbent devices. As another example, the unavailability may be based at least partly on an intention of the incumbent device(s) to retake the shared spectrum for primary usage. As another example, the unavailability may be based at least partly on a resumption of spectrum activity for the incumbent devices in the shared spectrum. As another example, the unavailability may be based at least partly on one or more scheduled periods of activity for the incumbent devices in the shared spectrum.

At operation 850, the eNB 570 may refrain from transmission of data messages in the shared spectrum. At operation 855, the eNB 570 may transmit, to the UEs 580, a spectrum vacate message that may indicate to the UEs 580 to refrain from usage of the shared spectrum. As a non-limiting example, operations 850 and/or 855 may be performed by the eNB 570 in response to or based on the reception of the spectrum unavailability message from the LC device 560.

It should be noted that embodiments are not limited to the usage of the spectrum unavailability message and/or the spectrum vacate message for indication of the information in operations 845 and 855. As an example, other messages may be used. As another example, a spectrum activity indicator (or other suitable indicator) may be used to indicate the unavailability of the shared spectrum and to indicate to the eNB 570 to refrain from secondary usage of the shared spectrum. Such indicators may or may not be included in the spectrum unavailability message or other message.

As an example, the eNB 570 may transmit a first data message to a first UE 580 in a portion of the shared spectrum. The transmission of the first data message may be part of a secondary usage of the shared spectrum. At operation 860, the eNB 570 may transmit a second data message to the first UE 580 (or to a second, different UE 580) in dedicated spectrum that may be exclusive to the shared spectrum. The transmission of the second data message may be part of a primary usage of the shared spectrum by the eNB 570. In some cases, and the dedicated spectrum may be reserved at least partly for the primary usage by the eNB 570.

Figure 9:
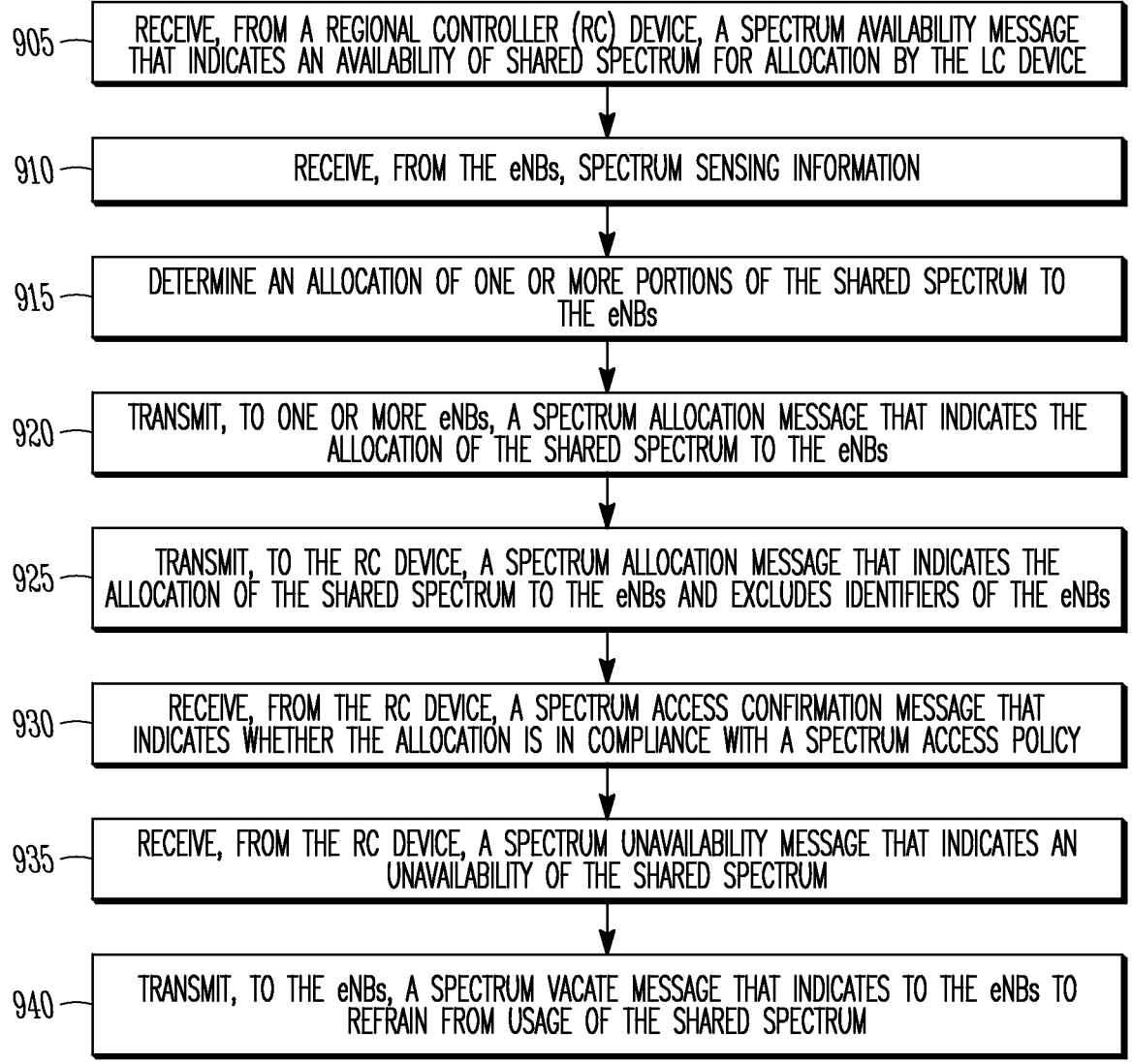
FIG. 9 illustrates the operation of another method of allocation of shared spectrum in accordance with some embodiments.

FIG. 9 illustrates the operation of another method of allocation of shared spectrum in accordance with some embodiments. As mentioned previously regarding the method 800, embodiments of the method 900 may include additional or even fewer operations or processes in comparison to what is illustrated in FIG. 9 and embodiments of the method 900 are not necessarily limited to the chronological order that is shown in FIG. 9. In describing the method 900, reference may be made to FIGS. 1-8 and 10-11, although it is understood that the method 900 may be practiced with any other suitable systems, interfaces and components. In addition, embodiments of the method 900 may refer to eNBs 104, UEs 102, APs, STAs, LC devices, RC devices or other wireless or mobile devices, although embodiments are not limited to those devices. The method 900 may also refer to an apparatus for an eNB 104, UE 102, LC device 560 and/or RC device 525 or other device described above.

It should be noted that the method 900 may be practiced at an LC device 560, and may include exchanging of signals or messages with an eNB 570. Similarly, the method 600 may be practiced at an eNB 570, and may include exchanging of signals or messages with an LC device 560 and/or UEs 580. In some cases, operations and techniques described as part of the method 600 may be relevant to the method 900. In addition, embodiments may include operations performed at the LC device 560 that are reciprocal or similar to other operations described herein performed at the eNB 570. For instance, an operation of the method 900 may include transmission of a message by the LC device while an operation of the method 600 may include reception of the same message or similar message by the eNB 570.

In addition, previous discussion of various techniques and concepts may be applicable to the method 900 in some cases, including the primary and secondary usage of the shared spectrum, allocation of the shared spectrum, retaking of the shared spectrum for primary usage, the MNO and LSA domains, spectrum sensing information, availability and/or unavailability of the shared spectrum, and others.

At operation 905, the LC device 560 may receive, from the RC device 525, one or more spectrum availability messages that may indicate an availability of shared spectrum for allocation, by the LC device 560, for secondary usage by a group of one or more eNBs 570. In some embodiments, the eNBs 570 may be included in an LCCG. At operation 910, the LC device 560 may receive, from one or more of the eNBs 570. In some embodiments, the spectrum sensing information may include or may be based on information received at the eNBs 570 from one or more connected UEs 580. Accordingly, such information may be filtered, anonymized or obfuscated as previously described, in some cases.

At operation 915, the LC device 560 may determine an allocation of one or more portions of the shared spectrum to the eNBs 570 for secondary usage. The allocation may be determined based on the spectrum information and/or localized spectrum access policies and/or other factors. At operation 920, the LC device 560 may transmit, to at least some of the eNBs 570, one or more spectrum allocation messages that may indicate the allocation of the shared spectrum. At operation 925, the LC device 560 may transmit, to the RC device, one or more spectrum allocation verification messages that may indicate the allocation of the shared spectrum. In some embodiments, the spectrum allocation verification messages may enable the RC device 525 to approve and/or verify that the allocation is in compliance with one or more spectrum access policies. In some cases, some or all of the information included in the spectrum allocation messages transmitted to the eNBs 570 at operation 920 may be excluded from the spectrum allocation verification messages transmitted to the RC device 525 at operation 925. As previously described, information such as identifiers of the eNBs 570 may be excluded from the spectrum allocation verification messages to anonymize the information provided to the RC device 525 about the LCCG. However, in some cases, the spectrum allocation messages and the spectrum allocation verification messages may include common information. At operation 930, the LC device 560 may receive, from the RC device 525, a spectrum access confirmation message that may indicate whether the allocation is in compliance with a spectrum access policy.

At operation 935, the LC device 560 may receive, from the RC device 525, a spectrum unavailability message that may indicate an unavailability of the shared spectrum. At operation 940, the LC device 560 may transmit, to the eNBs 570, a spectrum vacate message that may indicate to the eNBs 570 to refrain from usage of the shared spectrum. As previously described, other messages and/or indicators may be used in addition to or instead of the messages described for the operations of the method 900.

Figure 10:
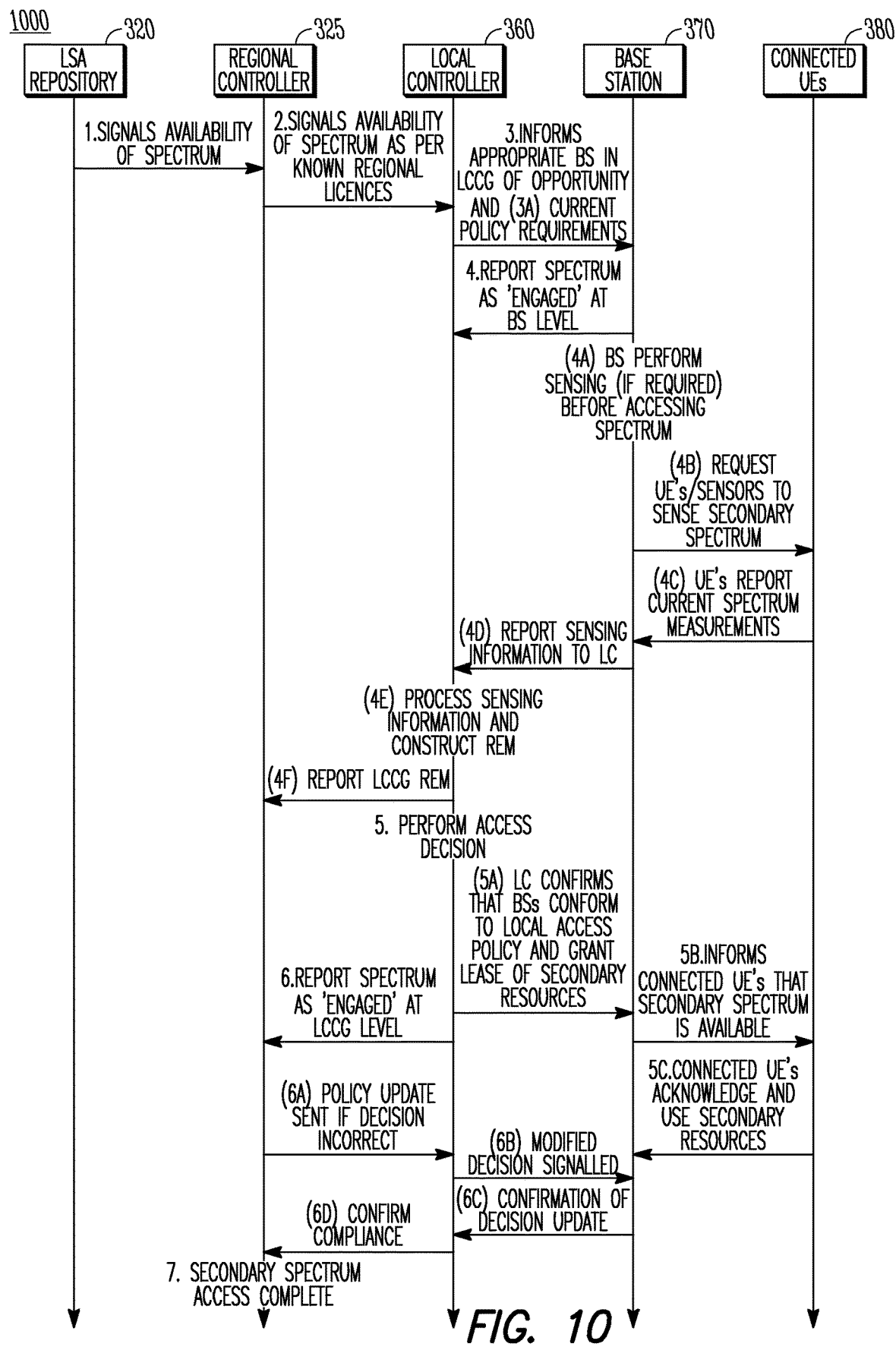
FIG. 10 illustrates a signal flow diagram for an example of notification of an availability of shared spectrum in accordance with some embodiments.

FIG. 10 illustrates a signal flow diagram for an example of notification of an availability of shared spectrum in accordance with some embodiments. It should be noted that embodiments are not limited to the operations shown in the example scenario 1000. Some embodiments may include fewer operations than what is shown in the example scenario 1000 in FIG. 10 and some embodiments may include additional operations not shown in example scenario 1000 in FIG. 10. In addition, embodiments are not limited to the chronological ordering shown in the example scenario 1000 in FIG. 10. It should be noted that concepts and/or techniques described herein may be applicable to the example scenario 1000.

The LSA repository 520 may signal an availability of spectrum to the RC device 525, which may signal the availability to the LC device 560, which may signal the availability to the eNB 570. It should be noted that the LCCG may include multiple eNBs 570, in some cases.

In some cases, operations 4a-4f may be performed when spectrum sensing is required and/or requested. In some cases, operations 6a-6d may be performed when modification to a localized spectrum access policy is required and/or requested.

Figure 11:
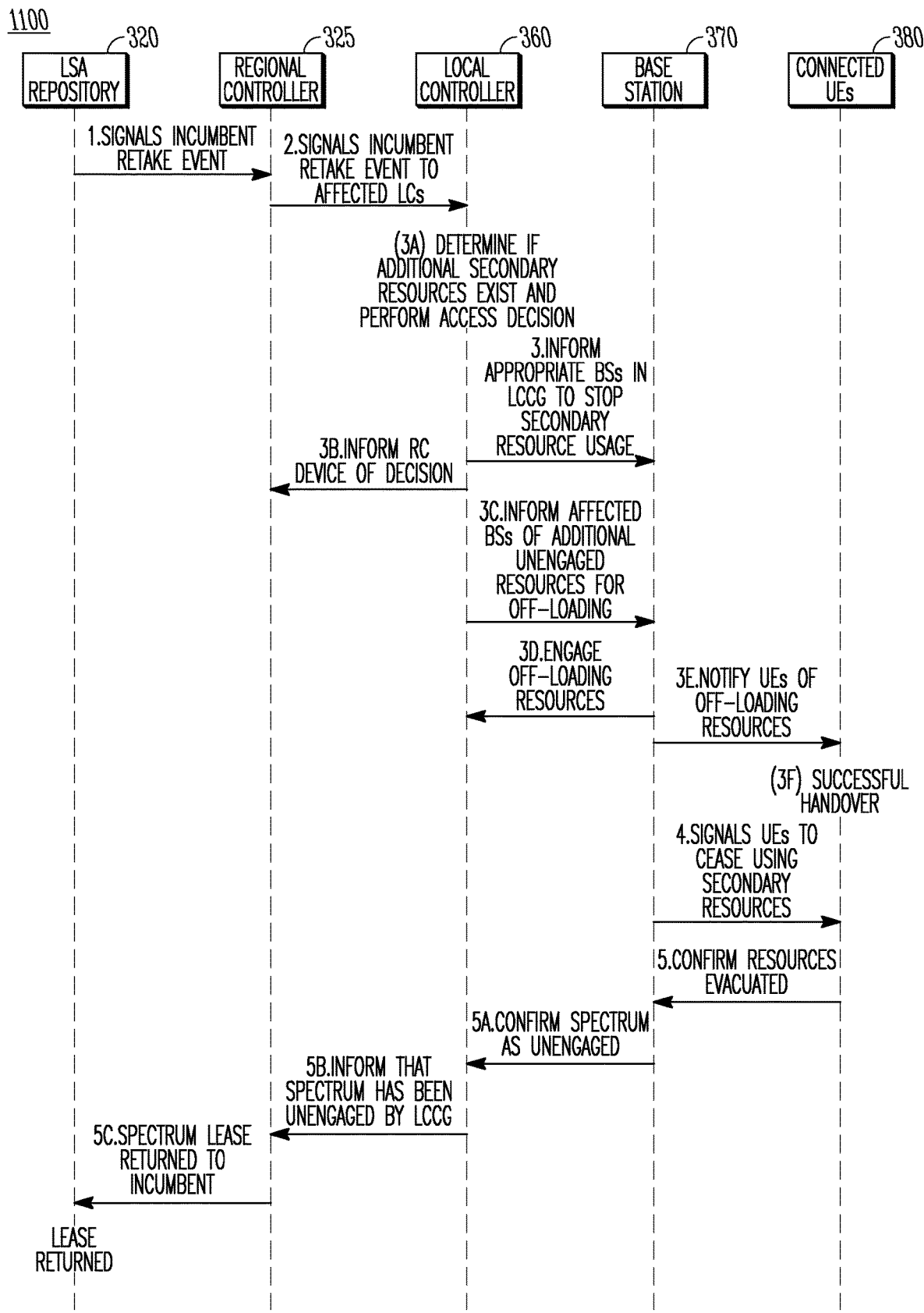
FIG. 11 illustrates a signal flow diagram for an example of notification of an unavailability of shared spectrum in accordance with some embodiments.

FIG. 11 illustrates a signal flow diagram for an example of notification of an unavailability of shared spectrum in accordance with some embodiments. It should be noted that embodiments are not limited to the operations shown in the example scenario 1100. Some embodiments may include fewer operations than what is shown in the example scenario 1100 in FIG. 11 and some embodiments may include additional operations not shown in example scenario 1100 in FIG. 11. In addition, embodiments are not limited to the chronological ordering shown in the example scenario 1100 in FIG. 11. It should be noted that concepts and/or techniques described herein may be applicable to the example scenario 1100.

The LSA repository 520 may signal, to the RC device 525, an unavailability of spectrum. As an example, an incumbent may retake or intend to retake the shared spectrum for primary usage. The unavailability may be signaled by the RC device 525 to the LC device 560.

In some cases, when operation 3a determines that additional secondary resources exist, operation 3 may be performed. When there are no additional resources available for the handover, however, operation 4 may be performed after operation 3. This flow of events may occur when there are no additional resources available to facilitate an off-loading of resources and when no sensing and/or additional conditions are required before transferring of the spectrum lease.

In Example 1, an apparatus for a base station may comprise transceiver circuitry and hardware processing circuitry. The hardware processing circuitry may configure the transceiver circuitry to receive, from a controller device, a spectrum availability message that indicates an availability of shared spectrum for secondary usage by the base station for communication with one or more mobile devices. The hardware processing circuitry may further configure the transceiver circuitry to transmit, to the controller device, a spectrum engagement message that indicates an intention of the base station to use at least a portion of the shared spectrum for the communication with the mobile devices. The shared spectrum may be at least partly reserved for primary usage by one or more incumbent base stations, and the availability of the shared spectrum for the secondary usage may be based at least partly on the primary usage.

In Example 2, the subject matter of Example 1, wherein the controller device and the base station may be configured to operate in a network and the primary usage of the shared spectrum may be prioritized, by the network, over the secondary usage of the shared spectrum.

In Example 3, the subject matter of one or any combination of Examples 1-2, wherein the availability of the shared spectrum for the secondary usage may be restricted to inactivity periods of the incumbent devices.

In Example 4, the subject matter of one or any combination of Examples 1-3, wherein the hardware processing circuitry may further configure the transceiver circuitry to receive, from the controller device, a compliance indicator for the intended usage, by the base station, of the portion of the shared spectrum. The hardware processing circuitry may further configure the transceiver circuitry to transmit a data message to at least one of the mobile devices in the portion of the shared spectrum.

In Example 5, the subject matter of one or any combination of Examples 1-4, wherein the hardware processing circuitry may further configure the transceiver circuitry to receive, from the controller device, a spectrum unavailability message that indicates an unavailability of the shared spectrum. The hardware processing circuitry may further configure the transceiver circuitry to transmit, to the mobile devices, a spectrum vacate message that indicates to the mobile devices to refrain from usage of the shared spectrum.

In Example 6, the subject matter of one or any combination of Examples 1-5, wherein the availability of the shared spectrum for the secondary usage by the base station may be based at least partly on an inactivity condition of the incumbent devices. The unavailability of the shared spectrum for the secondary usage by the base station may be based at least partly on an activity condition of the incumbent devices.

In Example 7, the subject matter of one or any combination of Examples 1-6, wherein the hardware processing circuitry may further configure the transceiver circuitry to transmit, to the controller device, spectrum sensing information that is based at least partly on one or more signal strength measurements for at least a portion of the mobile devices.

In Example 8, the subject matter of one or any combination of Examples 1-7, wherein the hardware processing circuitry may further configure the transceiver circuitry to receive, from the controller device, a request for the spectrum sensing information.

In Example 9, the subject matter of one or any combination of Examples 1-8, wherein the spectrum sensing information may include an average of the signal strength measurements. The spectrum sensing information may exclude the signal strength measurements and identifiers of the mobile devices to enable an anonymization, to the controller device, of the spectrum sensing information.

In Example 10, the subject matter of one or any combination of Examples 1-9, wherein the spectrum sensing information may further include one or more geographical locations of the mobile devices.

In Example 11, the subject matter of one or any combination of Examples 1-10, wherein the hardware processing circuitry may further configure the transceiver circuitry to transmit a first data message to at least one of the mobile devices in the portion of the shared spectrum. The hardware processing circuitry may further configure the transceiver circuitry to transmit a second data message to at least one of the mobile devices in dedicated spectrum that is exclusive to the shared spectrum. The dedicated spectrum may be reserved at least partly for usage by the base station.

In Example 12, the subject matter of one or any combination of Examples 1-11, wherein the controller device may be a Local Controller (LC) device arranged to operate in a Licensed Shared Access (LSA) network.

In Example 13, the subject matter of one or any combination of Examples 1-12, wherein the base station may be included in a Local Controller Control Group (LCCG) that includes multiple base stations configured to receive spectrum availability messages from the LC device.

In Example 14, the subject matter of one or any combination of Examples 1-13, wherein the controller device may be arranged to operate in a Spectrum Access System (SAS) network, and the controller device may be a Local SAS controller device.

In Example 15, the subject matter of one or any combination of Examples 1-14, wherein the base station may be an Evolved Node-B (eNB), the mobile devices may be User Equipments (UEs), and the eNB and the UEs may be arranged to operate according to a Third Generation Partnership Project (3GPP) protocol.

In Example 16, the subject matter of one or any combination of Examples 1-15, wherein the apparatus may further include one or more antennas coupled to the transceiver circuitry for the reception of the spectrum availability message and for the transmission of the spectrum engagement message.

In Example 17, a non-transitory computer-readable storage medium may store instructions for execution by one or more processors to perform operations for communication by a base station. The operations may configure the one or more processors to receive, from a controller device, a spectrum inactivity indicator for shared spectrum that is at least partly reserved for priority usage by one or more incumbent devices. The operations may further configure the one or more processors to transmit a data message to a mobile device in at least a portion of the shared spectrum. The operations may further configure the one or more processors to receive, from the controller device, a spectrum activity indicator that indicates a resumption of spectrum activity for the incumbent devices in the shared spectrum. The operations may further configure the one or more processors to refrain from transmission of data messages to the mobile device in the shared spectrum.

In Example 18, the subject matter of Example 17, wherein the spectrum inactivity indicator may be based at least partly on one or more scheduled periods of inactivity for the incumbent devices in the shared spectrum.

In Example 19, the subject matter of one or any combination of Examples 17-18, wherein the spectrum activity indicator may further indicate, to the base station, to refrain from usage of the shared spectrum. The operations may further configure the one or more processors to forward the spectrum activity indicator to the mobile device.

In Example 20, the subject matter of one or any combination of Examples 17-19, wherein the operations may further configure the one or more processors to transmit spectrum sensing information to the controller device. The spectrum sensing information may include a combined signal strength measurement that is based on signal strength measurements for one or more mobile devices that are connected to the base station. The spectrum sensing information may exclude the signal strength measurements and further excludes identifiers of the mobile devices. The exclusion of the signal strength measurements and the identifiers of the mobile devices may enable an anonymization of the spectrum sensing information.

In Example 21, the subject matter of one or any combination of Examples 17-20, wherein the operations may further configure the one or more processors to transmit a second data message to the mobile device in dedicated spectrum that is exclusive to the shared spectrum. The dedicated spectrum may be reserved at least partly for usage by the base station.

In Example 22, the subject matter of one or any combination of Examples 17-21, wherein the controller device may be a Local Controller (LC) device arranged to operate in a Licensed Shared Access (LSA) network.

In Example 23, the subject matter of one or any combination of Examples 17-22, wherein the base station may be an Evolved Node-B (eNB), the mobile devices may be User Equipments (UEs), and the eNB and the UEs may be arranged to operate according to a Third Generation Partnership Project (3GPP) protocol.

In Example 24, a Local Controller (LC) device may comprise transceiver circuitry and hardware processing circuitry. The hardware processing circuitry may configure the transceiver circuitry to receive, from a Regional Controller (RC) device, one or more spectrum availability messages that indicate an availability of shared spectrum for allocation, by the LC device, for secondary usage by a group of one or more Evolved Node-Bs (eNBs). The hardware processing circuitry may further configure the transceiver circuitry to transmit a spectrum allocation message to the eNBs to indicate an allocation of one or more portions of the shared spectrum to the eNBs for secondary usage. The shared spectrum may be at least partly reserved for primary usage by one or more incumbent devices, and the availability of the shared spectrum for the secondary usage may be based at least partly on the primary usage.

In Example 25, the subject matter of Example 24, wherein the hardware processing circuitry may further configure the transceiver circuitry to receive, from the eNBs, spectrum sensing information that is based at least partly on received signal strength measurements of UEs configured to communicate with the eNBs and further based at least partly on geographical locations of the UEs.

In Example 26, the subject matter of one or any combination of Examples 24-25, wherein the hardware processing circuitry may be further configure to determine the allocation of the shared spectrum to the eNBs based at least partly on the received spectrum sensing information.

In Example 27, the subject matter of one or any combination of Examples 24-26, wherein the hardware processing circuitry may further configure the transceiver circuitry to transmit, to the RC device, one or more spectrum allocation messages. The spectrum allocation messages may indicate the portions of the shared spectrum that are allocated to the eNBs and exclude identifiers of the eNBs.

In Example 28, the subject matter of one or any combination of Examples 24-27, wherein the spectrum availability messages may include a spectrum access policy to restrict the allocation of the shared spectrum to the eNBs. The hardware processing circuitry may further configure the transceiver circuitry to receive, from the RC device, a spectrum access confirmation message that indicates whether the allocation of the shared spectrum to the eNBs for secondary usage is in compliance with the spectrum access policy.

In Example 29, the subject matter of one or any combination of Examples 24-28, wherein the exclusion of the identifiers of the eNBs may enable an anonymization, to the RC device, of the allocations of the shared spectrum.

In Example 30, the subject matter of one or any combination of Examples 24-29, wherein the LC device and the RC device may be configured to operate in a Licensed Shared Access (LSA) network.

In Example 31, the subject matter of one or any combination of Examples 24-30, wherein the hardware processing circuitry may further configure the transceiver circuitry to receive, from the RC device, a spectrum unavailability message that indicates an unavailability of the shared spectrum for the allocation for the secondary usage. The hardware processing circuitry may further configure the transceiver circuitry to transmit, to the eNBs, a spectrum vacate message that indicates to the eNBs to refrain from usage of the shared spectrum. The unavailability of the shared spectrum may be based at least partly on an activity condition of the incumbent devices.

In Example 32, the subject matter of one or any combination of Examples 24-31, wherein the availability of the shared spectrum for the allocation for the secondary usage may be restricted to inactivity periods of the incumbent devices.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a Local Controller (LC), the apparatus comprising:
    processing circuitry; and
    memory, the processing circuitry to configure the LC for operating in a Licensed Shared Access (LSA) network, wherein, for LSA network operations, the processing circuitry is configured to:
    decode, from an LSA repository (LR), one or more spectrum availability messages that indicate an availability of LSA spectrum for allocation, by the LC, for secondary usage by one or more base stations (BSs);
    encode a spectrum allocation message for sending to the one or more BSs to indicate an allocation of one or more portions of the LSA spectrum to the one or more BSs for secondary usage, wherein spectrum allocation by the Local Controller is responsive to changes in network topology;
    decode, from a first of the one or more BSs, spectrum sensing information to verify available portions of the LSA spectrum are free from incumbent device usage; and
    encode a spectrum engagement message for sending to the LR, the spectrum engagement message indicating that the first BS is to use a portion of the LSA spectrum for communication with user equipments (UEs), wherein the portion of LSA spectrum indicated in the spectrum engagement message is verified to be free from incumbent usage based on the spectrum sensing information,
    wherein the LSA spectrum is at least partly reserved for primary usage by one or more incumbent devices, and the availability of the LSA spectrum for the secondary usage is based at least partly on inactive periods of incumbents usage,
    wherein the processing circuitry is further configured to encode one or more second spectrum allocation messages to send to the LR,
    wherein the one or more second spectrum allocation messages are encoded to indicate the one or more portions of the LSA spectrum that are allocated to the one or more BSs, and exclude identifiers of the one or more BSs.

2. The apparatus according to claim 1, wherein the spectrum sensing information is based at least partly on received signal strength measurements by the UEs, and further based at least partly on geographical locations of the UEs.

3. The apparatus according to claim 2, wherein the processing circuitry is further configured to determine the allocation of the LSA spectrum to the one or more BSs based at least partly on the received spectrum sensing information.

4. The apparatus according to claim 1,
    wherein the one or more second spectrum availability messages include a spectrum access policy to restrict the allocation of the LSA spectrum to the one or more BSs, wherein the processing circuitry is further configured to decode a spectrum access confirmation message received from the LR, the spectrum access confirmation message indicating whether the allocation of the LSA spectrum to the one or more BSs for secondary usage is in compliance with the spectrum access policy.

5. The apparatus according to claim 1, wherein the exclusion of the identifiers of the one or more BSs enables an anonymization, to the LR, of the allocations of the LSA spectrum.

6. The apparatus according to claim 1, wherein the processing circuitry is further configured to:
    receive, from the LR, a spectrum unavailability message that indicates an unavailability of the LSA spectrum for the allocation for the secondary usage; and
    encode for transmission to the one or more BSs, a spectrum vacate message that indicates the one or more BSs are to refrain from usage of the allocated LSA spectrum,
    wherein the unavailability of the LSA spectrum is based at least partly on an activity condition of the incumbent devices.

7. The apparatus according to claim 1, wherein the processing circuitry is configured to send the spectrum allocation message to the one or more base stations via an Operations, Administration and Maintenance (OAM) entity.

8. A method for operating a Local Controller (LC) in a Licensed Shared Access (LSA) network, the method comprising:
    decoding, from an LSA repository (LR), one or more spectrum availability messages that indicate an availability of LSA spectrum for allocation, by the LC, for secondary usage by one or more base stations (BSs);
    encoding a spectrum allocation message for sending to the one or more BSs to indicate an allocation of one or more portions of the LSA spectrum to the one or more BSs for secondary usage, wherein spectrum allocation by the Local Controller is responsive to changes in network topology;
    decoding, from a first of the one or more BSs, spectrum sensing information to verify available portions of the LSA spectrum are free from incumbent device usage;
    encoding a spectrum engagement message for sending to the LR, the spectrum engagement message indicating that the first BS is to use a portion of the LSA spectrum for communication with user equipments (UEs), wherein the portion of LSA spectrum indicated in the spectrum engagement message is verified to be free from incumbent usage based on the spectrum sensing information, wherein the LSA spectrum is at least partly reserved for primary usage by one or more incumbent devices, and the availability of the LSA spectrum for the secondary usage is based at least partly on inactive periods of incumbents usage; and encoding one or more second spectrum allocation messages to send to the LR, wherein the one or more second spectrum allocation messages are encoded to indicate the one or more portions of the LSA spectrum that are allocated to the one or more BSs, and exclude identifiers of the one or more BSs.

9. The method according to claim 8, wherein the spectrum sensing information is based at least partly on received signal strength measurements by the UEs, and further based at least partly on geographical locations of the UEs.

10. The method according to claim 9, further comprising:
determining the allocation of the LSA spectrum to the one or more BSs based at least partly on the received spectrum sensing information.

11. The method according to claim 8, wherein the one or more second spectrum availability messages include a spectrum access policy to restrict the allocation of the LSA spectrum to the one or more BSs, the method further comprising:
decoding a spectrum access confirmation message received from the LR, the spectrum access confirmation message indicating whether the allocation of the LSA spectrum to the one or more BSs for secondary usage is in compliance with the spectrum access policy.

12. The method according to claim 8, wherein the exclusion of the identifiers of the one or more BSs enables an anonymization, to the LR, of the allocations of the LSA spectrum.

13. The method according to claim 8, further comprising:
sending the spectrum allocation message to the one or more base stations via an Operations, Administration and Maintenance (OAM) entity.

14. A non-transitory memory medium storing program instructions for operating a Local Controller (LC) in a Licensed Shared Access (LSA) network, wherein the program instructions, when executed by processing circuitry, cause the LC to implement:
decoding, from an LSA repository (LR), one or more spectrum availability messages that indicate an availability of LSA spectrum for allocation, by the LC, for secondary usage by one or more base stations (BSs);
encoding a spectrum allocation message for sending to the one or more BSs to indicate an allocation of one or more portions of the LSA spectrum to the one or more BSs for secondary usage, wherein spectrum allocation by the Local Controller is responsive to changes in network topology;
decoding, from a first of the one or more BSs, spectrum sensing information to verify available portions of the LSA spectrum are free from incumbent device usage;
encoding a spectrum engagement message for sending to the LR, the spectrum engagement message indicating that the first BS is to use a portion of the LSA spectrum for communication with user equipments (UEs), wherein the portion of LSA spectrum indicated in the spectrum engagement message is verified to be free from incumbent usage based on the spectrum sensing information, wherein the LSA spectrum is at least partly reserved for primary usage by one or more incumbent devices, and the availability of the LSA spectrum for the secondary usage is based at least partly on inactive periods of incumbents usage; and
encoding one or more second spectrum allocation messages to send to the LR, wherein the one or more second spectrum allocation messages are encoded to indicate the one or more portions of the LSA spectrum that are allocated to the one or more BSs, and exclude identifiers of the one or more BSs.

15. The memory medium according to claim 14, wherein the spectrum sensing information is based at least partly on received signal strength measurements by the UEs, and further based at least partly on geographical locations of the UEs.

16. The memory medium according to claim 15, wherein the program instructions, when executed by the processing circuitry, further cause the LC to implement:
determining the allocation of the LSA spectrum to the one or more BSs based at least partly on the received spectrum sensing information.

17. The memory medium according to claim 14, wherein the program instructions, when executed by the processing circuitry, further cause the LC to implement:
sending the spectrum allocation message to the one or more base stations via an Operations, Administration and Maintenance (OAM) entity.

* * * * *